(12) United States Patent
Mortensen et al.

(10) Patent No.: US 12,528,066 B2
(45) Date of Patent: *Jan. 20, 2026

(54) ENDOTHERMIC REACTION OF A FEED GAS HEATED BY RESISTANCE HEATING

(71) Applicants: HALDOR TOPSØE A/S, Kgs. Lyngby (DK); GRUNDFOS HOLDING A/S, Bjerringbro (DK)

(72) Inventors: Peter Mølgaard Mortensen, Roskilde (DK); Kasper Emil Larsen, Humlebæk (DK); Kim Aasberg-Petersen, Allerød (DK); Sebastian Thor Wismann, Allerød (DK); Flemming Buus Bendixen, Hobro (DK); Peter Valler, Aalborg SØ (DK); Alexandru Sorea, Aalborg Øst (DK)

(73) Assignees: HALDOR TOPSØE A/S, Kgs. Lyngby (DK); GRUNDFOS HOLDING A/S, Bjerringbro (DK)

( * ) Notice: Subject to any disclaimer, the term of this patent is extended or adjusted under 35 U.S.C. 154(b) by 770 days.

This patent is subject to a terminal disclaimer.

(21) Appl. No.: 17/782,286

(22) PCT Filed: Dec. 3, 2020

(86) PCT No.: PCT/EP2020/084417
§ 371 (c)(1),
(2) Date: Jun. 3, 2022

(87) PCT Pub. No.: WO2021/110811
PCT Pub. Date: Jun. 10, 2021

(65) Prior Publication Data
US 2023/0020274 A1    Jan. 19, 2023

(30) Foreign Application Priority Data
Dec. 4, 2019   (EP) .................................... 19213445

(51) Int. Cl.
*B01J 15/00* (2006.01)
*B01J 19/00* (2006.01)
(Continued)

(52) U.S. Cl.
CPC ......... *B01J 15/005* (2013.01); *B01J 19/0013* (2013.01); *B01J 19/2485* (2013.01);
(Continued)

(58) Field of Classification Search
CPC .. C01B 3/00; C01B 3/02; C01B 3/032; C01B 3/34; C01B 3/38; C01B 3/40;
(Continued)

(56) References Cited

U.S. PATENT DOCUMENTS 5,393,586 A   2/1995 Lipp
5,655,211 A   8/1997 Maus
(Continued)

FOREIGN PATENT DOCUMENTS

CN   1180982 A   5/1998
CN   1199509 A   11/1998
(Continued)

OTHER PUBLICATIONS

European Search Report dated May 20, 2020 for European Application No. 19213445. (8 pages).
(Continued)

*Primary Examiner* — Natasha E Young
(74) *Attorney, Agent, or Firm* — Boone IP Law

(57) ABSTRACT

Structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material at least partly is a composite in the form of a homogenous
(Continued)

mixture of an electrically conductive metallic material and a ceramic material, wherein the macroscopic structure at least partly is composed of two or more materials with different resistivities.

35 Claims, 19 Drawing Sheets

(51) Int. Cl.
| | |
|---|---|
| *B01J 19/24* | (2006.01) |
| *B01J 21/04* | (2006.01) |
| *B01J 35/33* | (2024.01) |
| *B01J 35/56* | (2024.01) |
| *C01B 3/40* | (2006.01) |

(52) U.S. Cl.
CPC ............... *B01J 21/04* (2013.01); *B01J 35/33* (2024.01); *B01J 35/56* (2024.01); *C01B 3/40* (2013.01); *B01J 2219/00135* (2013.01); *B01J 2219/00155* (2013.01); *C01B 2203/0233* (2013.01); *C01B 2203/085* (2013.01); *C01B 2203/1023* (2013.01); *C01B 2203/1082* (2013.01)

(58) Field of Classification Search
CPC ............ C01B 2203/00; C01B 2203/02; C01B 2203/0205; C01B 2203/0227; C01B 2203/0233; C01B 2203/08; C01B 2203/0805; C01B 2203/085; C01B 2203/10; C01B 2203/1005; C01B 2203/1023; C01B 2203/1041; C01B 2203/1082; Y02P 20/00; Y02P 20/50; Y02P 20/52
See application file for complete search history.

(56) References Cited

U.S. PATENT DOCUMENTS

| | | | |
|---|---|---|---|
| 5,852,285 A | 12/1998 | Kato et al. | |
| 5,877,474 A | 3/1999 | Konishi | |
| 8,053,992 B2 * | 11/2011 | Masuda | C01B 3/38 |
| | | | 315/111.21 |
| 2002/0081253 A1 | 6/2002 | Abe | |
| 2003/0036001 A1 | 2/2003 | James et al. | |
| 2009/0238751 A1 | 9/2009 | Wilhite et al. | |
| 2015/0087497 A1 | 3/2015 | Chiffey et al. | |
| 2017/0314441 A1 | 11/2017 | Rentaro | |
| 2018/0148330 A1 * | 5/2018 | Tamhankar | B01J 23/462 |
| 2019/0009252 A1 * | 1/2019 | Chi | B01J 21/04 |
| 2019/0299201 A1 | 10/2019 | Naoya | |
| 2023/0032787 A1 * | 2/2023 | Mortensen | B01J 35/56 |

FOREIGN PATENT DOCUMENTS

| | | |
|---|---|---|
| CN | 105556085 A | 5/2016 |
| CN | 107339136 A | 11/2017 |
| CN | 110314705 A | 10/2019 |
| DE | 102013226126 A1 | 6/2015 |
| EP | 0637360 A1 | 2/1995 |
| EP | 2092977 A2 | 8/2009 |
| JP | 07-080321 A | 3/1995 |
| JP | 2709302 B2 | 2/1998 |
| JP | 2012-072042 A | 4/2012 |
| WO | 2019110268 A1 | 6/2019 |

OTHER PUBLICATIONS

International Search Report (PCT/ISA/210) and Written Opinion (PCT/ISA/237) mailed on Mar. 17, 2021, by the European Patent Office as the International Searching Authority for International Application No. PCT/EP2020/084417. (11 pages).
International Preliminary Report on Patentability received for PCT Patent Application No. PCT/EP2020/084417, mailed on Jun. 16, 2022, 9 pages.
Office Action received for Chinese Patent Application No. 202080084547.8, mailed on Aug. 16, 2023, 27 pages (15 pages of English Translation and 12 pages of Original Document).

* cited by examiner

ENDOTHERMIC REACTION OF A FEED GAS HEATED BY RESISTANCE HEATING

This application is a national stage application of International Patent Application No. PCT/EP2020/084417, now WO 2021/110811, filed on Dec. 3, 2020, that claims foreign priority to European Patient Application No. EP19213445.0, filed on Dec. 4, 2019, the contents of which are incorporated herein by reference.

FIELD OF THE INVENTION

The invention relates to a structured catalyst for carrying out an endothermic reaction of a feed gas, wherein said structured catalyst comprises a macroscopic structure of first electrically conductive material, said macroscopic structure supporting a ceramic coating, wherein said ceramic coating supports a catalytically active material.

BACKGROUND

Endothermic reactions will often be challenged by how efficient heat can be transferred to the reactive zone of the catalyst bed within a reactor unit. Conventional heat transfer by convection, conduction, and/or radiation heating can be slow and will often meet large resistance in many configurations. This challenge can be illustrated with the tubular reformer in a steam reforming plant, which practically can be considered as a large heat exchanger with heat transfer as the rate limiting step. The temperature at the innermost part of the tubes of the tubular reformer is somewhat lower than the temperature outside the tubes due to the heat transfer rate through the walls of the tube and to the catalyst within the tubes as well as due to the endothermic nature of the steam reforming reaction.

One way to supply heat within catalyst instead of outside the tubes housing the catalyst is by means of electrical resistance heating. DE102013226126 describes a process for allothermal methane reforming with physical energy reclamation, wherein methane is reformed by means of carbon dioxide to synthesis gas consisting of carbon monoxide and hydrogen. The starting gases $CH_4$ and $CO_2$ are conducted in a fixed bed reactor consisting of electrically conductive and catalytic particles, which is electrically heated to temperatures of about 1000 K. The conversion of the reactant gases and the generation of heat of the generated synthesis gas take place in the fixed bed reactor.

It is an object of the invention to provide an alternative configuration of an electrically heated structured catalyst and reactor system for carrying out endothermic reactions of a feed gas.

It is also an object of the invention to provide a structured catalyst and reactor system with integrated heat supply and catalysts.

It is a further object of the invention to provide a structured catalyst and a reactor system for carrying out endothermic reactions of a feed gas comprising hydrocarbons wherein the overall energy consumption is reduced compared to a system with an externally heated reactor, such as a side fired or top fired steam methane reformer (SMR), which is the reference for industrial scale steam reforming. By utilizing electric heating, the high temperature flue gas of the fired SMR is avoided and less energy is therefore needed in the reforming section of the electrically heated reactor.

It is another object of the invention to provide a structured catalyst and reactor system for carrying out endothermic reactions of a feed gas, e.g. a feed gas comprising hydrocarbons, wherein the amount of catalyst and the size of the reactor system is reduced compared to conventional reactors for carrying out endothermic reactions. Moreover, the invention provides for the possibility of tailoring and thus reducing the amount of catalytically active material, while having a controlled reaction front of the reaction.

It is furthermore an object of the invention to provide a process for production of a product gas from an endothermic reaction of a feed gas, e.g. a feed gas comprising hydrocarbons, wherein the product gas output from the reactor system has a relatively high temperature and a relatively high pressure. In particular, it is desirable if the temperature of the product gas output from the reactor system is between about 900° C. and 1100° C. or even up to 1300° C., and if the pressure of the product gas output from the reactor system is between about 30 bar and about 100 bar. The invention will allow for precise control of the temperature of the product gas output from the reactor system.

An advantage of the invention is that the overall emission of carbon dioxide and other emissions detrimental to the climate may be reduced considerably, in particular when the power used in the reactor system is from renewable energy resources.

SUMMARY OF THE INVENTION

The present invention is directed to a structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material at least partly is a composite in the form of a homogenous mixture of an electrically conductive metallic material and a ceramic material, wherein the macroscopic structure at least partly is composed of two or more materials with different resistivities.

The present invention is directed to the improvement of a structured catalyst of the type comprising a macroscopic structure of electrically conductive material, wherein said macroscopic structure supports a ceramic coating, and wherein said ceramic coating supports a catalytically active material.

The present invention is based on the finding that for a structured catalyst of the said type an electrically conductive material in the form of a homogenous mixture of an electrically conductive metallic material and a ceramic material can be made to have a selected level of resistivity, and that by using an electrically conductive material with an increased resistivity it is possible to increase the heat flux through the material. The present invention has shown that by applying a structured catalyst with a higher resistivity as achieved by the composite material, an increased cross section of the structured catalyst can be used, which provides a possibility of reducing the number of structured catalysts required. This in turn reduces the required number of monolith bridges and hence the number of connection required to construct an array of the invention.

The invention is further based on the recognition that when using an electrically conductive material in the form of the above mentioned composite material, it is possible to produce a structured catalyst, which has different resistivities and hence heat fluxes in the direction of feed gas flow through the catalyst. Such a design in turn allows optimization of the endothermic reaction to take place in the catalyst to achieve a more efficient reaction.

The present invention further relates to a reactor system for carrying out an endothermic reaction of a feed gas, said reactor system comprising:
a) a catalyst of the invention;
b) a pressure shell housing said catalyst, said pressure shell comprising an inlet for letting in said feed gas and an outlet for letting out product gas, wherein said inlet is positioned so that said feed gas enters said catalyst in a first end and said product gas exits said catalyst from a second end; and
c) a heat insulation layer between said structured catalyst and said pressure shell.

The present invention further relates to use of the catalyst according to the invention or the reactor system of the invention, wherein the endothermic reaction is selected from the group consisting of steam methane reforming, hydrogen cyanide formation, methanol cracking, ammonia cracking, reverse water gas shift and dehydrogenation.

Definitions

In connection with the present invention the terms discussed below have the flowing meanings:

The term "monolith" means a coherent structure with a well-defined surface area, wherein "coherent" means a continuous phase.

The term "sintered treatment" means the process of compacting and forming a solid mass of material involving heating at least a part of the material to become mouldable or diffusible without melting the material to the point of liquefactions and then cooling the material to solidify in its final form.

The term "hot spot" means a spot of an electrically conductive structured catalyst material, wherein the material in the spot has become highly heated due to local high current density transferring an electrical energy to the spot, which significantly exceeds the energy required to drive a chemical reaction in the vicinity of the spot, and wherein there is a risk that the material become damaged due to the heating of the material to a temperature close to its melting point.

The term "resistivity" of a material means resistivity as measured by the method comprising the steps of passing a fixed current is through the material, measuring the potential difference across said material, and correlating to the resistivity according to Ohm's law. Alternatively, other conventional methods well-known in the art may be used.

The term "at the first end" in relation where on a monolith a bridge is connected means at a position on the monolith closer to the first end than to the second end. The term "at the second end" in relation where on a monolith a bridge is connected means at a position on the monolith closer to the second end than to the first end.

The term "monolith bridge" means a bridge connecting two monoliths, wherein the bridge is a coherent structure, wherein "coherent" means a continuous phase.

The term "composite in the form of a homogenous mixture" means a mixture, which has the same proportion of its component throughout any given sample of the mixture.

The term "non-composite electrically conductive metallic material" means an electrically conductive metallic material, which does not contain a ceramic material.

The term "moldable state" means that the material is in a shapeable state allowing the material to adhere and/or be integrated with another material in the same state. The term "current" includes both direct current and alternating current.

The term "green body" means a weakly bound, moldable material, e.g. in the form of bonded powder, before sintering or oxidizing takes place.

The term "consists of a plurality of chemical elements" means at least one chemical element.

Moreover, the term "steam reforming" is meant to denote a reforming reaction according to one or more of the following reactions:

$$CH_4+H_2O \leftrightarrow CO+3H_2 \quad \text{(i)}$$

$$CH_4+2H_2O \leftrightarrow CO_2+4H_2 \quad \text{(ii)}$$

$$CH_4+CO_2 \leftrightarrow 2CO+2H_2 \quad \text{(iii)}$$

Reactions (i) and (ii) are steam methane reforming reactions, whilst reaction (iii) is the dry methane reforming reaction.

For higher hydrocarbons, viz. $C_nH_m$, where $n \geq 2$, $m \geq 4$, equation (i) is generalized as:

$$C_nH_m+nH_2O \leftrightarrow nCO+(n+m/2)H_2 \quad \text{(iv)}$$

where $n \geq 2$, $m \geq 4$.

Typically, steam reforming is accompanied by the water gas shift reaction (v):

$$CO+H_2O \leftrightarrow CO_2+H_2 \quad \text{(v)}$$

The term "steam methane reforming" is meant to cover the reactions (i) and (ii), the term "steam reforming" is meant to cover the reactions (i), (ii) and (iv), whilst the term "methanation" covers the reverse reaction of reaction (i). In most cases, all of these reactions (i)-(v) are at, or close to, equilibrium at the outlet from the reactor system. The term "prereforming" is often used to cover the catalytic conversion of higher hydrocarbons according to reaction (iv). Prereforming is typically accompanied by steam reforming and/or methanation (depending upon the gas composition and operating conditions) and the water gas shift reaction. Prereforming is often carried out in adiabatic reactors but may also take place in heated reactors.

The term "hydrogen cyanide synthesis" is meant to denote the following reactions:

$$2CH_4+2NH_3+3O_2 \leftrightarrow 2HCN+6H_2O \quad \text{(vi)}$$

$$CH_4+NH_3 \leftrightarrow HCN+3H_2 \quad \text{(vii)}$$

The term "dehydrogenation" is meant to denote the following reaction:

$$R_1-CH_2-CH_2-R_2 \leftrightarrow R_1-CH=CH-R_2 \quad \text{(viii)}$$

Where $R_1$ and $R_2$ may be any appropriate group in a hydrocarbon molecule, such as —H, —$CH_3$, —$CH_2$, or —CH.

The term "methanol cracking" is meant to denote the following reactions:

$$CH_3OH \leftrightarrow CO+2H_2 \quad \text{(ix)}$$

$$CH_3OH+H_2O \leftrightarrow CO_2+3H_2 \quad \text{(x)}$$

Typically, methanol cracking reaction is accompanied by the water gas shift reaction (v).

The term "ammonia cracking" is meant to denote the following reactions:

$$2NH_3 \leftrightarrow N_2+3H_2 \quad \text{(xi)}$$

DETAILED DESCRIPTION OF THE INVENTION

Structured Catalyst of a Composite Material of the Invention

The present invention further relates to a structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material at least partly is a composite of an electrically conductive metallic material and a ceramic material, wherein the macroscopic structure at least partly is composed of two or more materials with different resistivities.

In a particular embodiment the macroscopic structure at least partly is composed of one or more composite materials and one or more non-composite electrically conductive metallic materials. In a particular embodiment the macroscopic structure at least partly is composed of two composite materials and one non-composite electrically conductive metallic materials. In a particular embodiment the macroscopic structure at least partly is composed of two or more composite materials.

The electrically conductive metallic material of the said composite may be any conventional catalytically active metallic material. In a particular embodiment of the structured catalyst of the invention, the metallic material is an alloy comprising one or more substances selected from the group consisting of Fe, Cr, Al, Co, Ni, Zr, Cu, Ti, Mn, and Si.

In a particular embodiment, the material of the macroscopic structure is selected from the group consisting of an alloy comprising iron and chromium, an alloy comprising iron, chromium and aluminum, an alloy comprising iron and cobalt, and an alloy comprising iron, aluminum, nickel, and cobalt. In a particular embodiment, the material of the macroscopic structure is a so-called "Alnico alloy", which is a specific type of alloy comprising iron, aluminum, nickel, and cobalt, and optionally also copper, titanium. In a particular embodiment, the material of the macroscopic structure is a FeCrAlloy comprises iron, chromium and aluminum. In a particular embodiment, the material of the macroscopic structure is the alloy "Kanthal" comprising iron, chromium and alumina. "Kanthal" has proven to be a good choice of material for the macroscopic structure due to its resistive properties.

The ceramic material of the said composite may be any conventional ceramic material. In a particular embodiment of the structured catalyst of the invention, the ceramic material is an oxide of a substance selected from the group consisting of Al, Mg, Ce, Zr, Ca, Y and La. In a particular embodiment of the structured catalyst of the invention, the ceramic material is selected from the group consisting of $Al_2O_3$, $ZrO_2$, $MgAl_2O_3$, $ZrO_2$, $MgAl_2O_3$, $CaAl_2O_3$, any combination thereof and any of said materials and combinations mixed with an oxide of Y, Ti, La, or Ce. In a particular embodiment of the structured catalyst of the invention, the ceramic material is selected from the group consisting of $Al_2O_3$, $ZrO_2$, $MgAl_2O_3$, $CaAl_2O_3$, and any combination thereof. Ceramic oxides have a low conductivity and hence have insulating properties. When added to an electrically conductive metallic material, ceramic oxides will increase the resistivity of the resulting composite material.

In a particular embodiment of the structured catalyst of the invention, the ratio based on weight of metallic material to ceramic material in the macroscopic structure is in the range of from 50 to 1, preferably from 40 to 1, more preferably from 30 to 2, more preferably from 24 to 3, and most preferably from 19 to 4.

In a particular embodiment of the structured catalyst of the invention, the structured catalyst has the form of at least one monolith, wherein the monolith has a number of flow channels formed therein for conveying said feed gas through the monoliths from a first end, where the feed gas enters, to a second end, where a product gas exits, wherein said monolith has a longitudinal axis extending form said first end to said second end.

In a particular embodiment of the structured catalyst of the invention, the macroscopic structure of the monolith is composed of two or more composite materials with different compositions positioned in the direction of said longitudinal axis so as provide different resistivities. In a particular embodiment of the structured catalyst of the invention, the macroscopic structure of the monolith is composed of at least, three composite materials, preferably at least four composite materials, more preferably at least five composite materials, more preferably at least six composite materials, more preferably at least seven composite materials, and most preferably at least eight composite materials. In a particular embodiment of the structured catalyst of the invention, the macroscopic structure of the monolith comprises at least a first, a second and a third composite material positioned in the direction from the first to the second end, wherein the second composite material has a higher resistivity as compared to the first and third composite material, the third composite material has a lower resistivity as compared to the first and second composite material, and the first composite material has a resistivity in between the resistivity of the second and third composite material. Such design provides a structured catalyst with different heat fluxes which can be correlated to the chemical reactions in the channels. Having a low heat flux in the first section of the monolith allows for a balance in the supplied heat towards the chemical reaction rate, because the rate of reaction is lower in the first end due to the lower temperatures in this end. When the temperature increases as the gas in the channels travels towards the second end, it is an advantage to have a higher heat flux because the chemical rate of reaction in this zone is also higher and more reactant can be consumed. At the second end of the monolith, it can be an advantage to have a low heat flux again, because at this end the maximum temperature is achieved, and controlling the temperature to a desired operating set point is made easier if the heat flux in this section is lower.

In a particular embodiment of the structured catalyst of the invention, the macroscopic structure of the monolith is composed of one or more composite materials with different compositions and a non-composite electrically conductive metallic material positioned in the direction of said longitudinal axis so as provide different resistivities.

In a particular embodiment of the structured catalyst of the invention, the macroscopic structure of the monolith is composed of two or more, preferably threes or more, more preferably four or more, more preferably five or more, more preferably six or more composite materials with different compositions and a non-composite electrically conductive metallic material positioned in the direction of said longitudinal axis so as provide different resistivities.

Preferably, the macroscopic structure of the monolith comprises at least a first and a second composite material and a non-composite electrically conductive metallic material positioned in the direction from the first to the second end, wherein the second composite material has a higher resistivity as compared to the first composite material and the non-composite material, the non-composite material has a lower resistivity as compared to the first and second composite material, and the first composite material has a resistivity in between the resistivity of the second composite material and the resistivity of the non-composite material. The technical advantages of such a design are the same as described in the preceding paragraph. The said embodiment of the structured catalyst is suitable for use in an array of the invention, cf. below. In such an array the monolith bridge electrically conductive material is preferably a non-composite electrically conductive metallic material, e.g. the same non-composite material as used in the macroscopic structure.

Different resistivities of the composite material may be obtained by changing one or more parameters selected from the group consisting of a) the ratio of the electrically conductive metallic material to the ceramic material, b) the size of the ceramic particles, c) the shape of the ceramic particles, and d) the type of the ceramic material.

In a particular embodiment of the structured catalyst of the invention, the monolith composed of two or more composite materials with different compositions is produced by a method comprising the following steps:
preparing a plurality of pastes comprising:
at least a first paste having a first composition, wherein the first paste comprises metal powder with a first alloy composition, ceramic powder, and a first binder,
and at least a second paste having a second composition, wherein the second paste (10b) comprises metal powder with a second alloy composition and a second binder
wherein the first alloy composition and the second alloy composition both consist of a plurality of chemical elements, and wherein the chemical elements are chosen so that, for each of the chemical elements being present in an amount higher than 0.5 weight % of the respective alloy composition, that chemical element is comprised both in the first and second alloy composition, and
for the chemical elements being present in the first alloy composition in amounts of up to 5.0 weight %, the amount of that chemical element differs by at most 1 percentage point between the first alloy composition and the second alloy composition, and
for the chemical elements being present in the first alloy composition in amounts of more than 5.0 weight %, the amount of that chemical element differs by at most 3 percentage point between the first alloy composition and the second alloy composition,
transferring the plurality of pastes into a supply chamber of a processing equipment,
shaping a green body from the plurality of pastes by forcing the pastes from the supply chamber through a die of the processing equipment, and
sintering or oxidizing the green body to obtain the composite component having a varying resistivity (p) along a longitudinal direction of the composite component, the longitudinal direction corresponding to the direction of movement of the pastes through the die, and the varying resistivity (p) resulting from the first composition being different from the second composition.

In a particular embodiment of the structured catalyst of the invention, the catalyst is the array of the invention.

The present invention further relates to a structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material is a composite in the form of a homogenous mixture of an electrically conductive metallic material and a ceramic material.

Array of the Catalyst of the Invention

In the present application the expression "array of the invention" means "array of the catalyst of the invention", and the two expressions are used interchangeably.

The present invention further relates to an array comprising a first and a second structured catalyst of the invention, wherein:
a) the first and second structured catalyst have the form of a first and second monolith, respectively;
b) each of said first and second monoliths has a number of flow channels formed therein for conveying said feed gas through the monoliths from a first end, where the feed gas enters, to a second end, where a product gas exits, wherein each of said first and second monoliths has a longitudinal axis extending from said first end to said secand end;
c) the array comprises at least a first and a second conductor electrically connected to said first and second monoliths, respectively, and to an electrical power supply, wherein said electrical power supply is dimensioned to heat at least part of said first and second monoliths to a temperature of at least 500° C. by passing an electrical current through said macroscopic structure, wherein said first conductor is electrically connected directly or indirectly to the first monolith and the second conductor is electrically connected directly or indirectly to the second monolith, and wherein the conductors are connected at positions on the array closer to said first end than to said second end,
d) said first and second monolith are electrically connected by a monolith bridge of a monolith bridge electrically conductive material,
e) the array is configured to direct an electrical current to run from the first conductor through the first monolith to said second end, then through the bridge, and then through the second monolith to the second conductor, and
f) said array has been produced by a process comprising the steps of
i) providing the electrically conductive materials of the first monolith, the second monolith and the monolith bridge in the form of three separate entities, and
ii) joining the separate entities together by a method comprising a step of sintering or oxidizing treatment.

The array of the present invention is constructed in such a way that electrical conductors, which supply electricity from the power supply, are connected at a position closest to the first end of the array of the structured catalyst, but by the configurations of the monolith bridge(s) still directs current to run from substantially one end to the opposite end of (most of) the individual monoliths. This feature establishes a temperature profile, where the temperature increases from the first end to the second end of the structured catalyst. This is advantageous because it provides a possibility of connecting the conductors to a colder end of this structured catalyst, a connection which is sensitive to high temperatures. Also, this is advantageous because it allows improved control of the chemical reaction front of the endothermic reactions facilitated by the structured catalyst.

In a particular embodiment of the array of the invention, the second conductor is connected directly to the second monolith. In this connection, the term "connected directly" means connected with no intermediate element, such as one or more monoliths. The connection of the conductor to the monolith may be a sintered connection or a mechanical connection, such as by welding, soldering or brazing.

In a particular embodiment of the array of the invention, the second conductor is indirectly electrically connected to the second monolith. In a particular embodiment of the array of the invention, the array further comprises (i) one or more juxtaposed additional intermediate monoliths of a structured catalyst and (ii) one end monolith of a structured catalyst, wherein each additional intermediate monolith is connected to at least two juxtaposed monoliths by a monolith bridge of a monolith bridge electrically conductive material, and wherein the end monolith is connected to at least one juxtaposed monolith, and wherein the second conductor is connected to the end monolith at a position on the monolith closer to said first end than to said second end. Preferably, the total number of the additional intermediate monoliths and the end monolith is an even integer, and the second conductor is connected to the end monolith at the first end of the array. Such a design allows current to run from one end to the opposite end of each monolith. In the said particular embodiment of the array of the invention, preferably the conductive material of the monolith bridges at the second end of the array are the same material. In the said particular embodiment of the array of the invention, preferably the conductive materials of the monolith bridges are the same material.

In the particular embodiment of the invention, where the array comprises one or more intermediate monoliths, the end monolith corresponds to the second monolith of the particular embodiment, where the array comprises a first and a second monolith only. In this particular embodiment of the invention, where the array comprises one or more intermediate monoliths, the second conductor is connected to the end monolith instead of the second monolith.

In a particular embodiment of the array of the invention, the total number of the additional intermediate monoliths and the end monolith is any number between 3 and 36.

In a particular embodiment of the array of the invention, the first and second monolith are connected by the monolith bridge at the second end of the array, wherein each additional intermediate monolith is serially connected to two juxtaposed monoliths by a monolith bridge of a monolith bridge electrically conductive material alternately at said first end and at said second end so as to direct the current from one end to the opposite end of each monolith, and wherein the end monolith is connected to one juxtaposed monolith at the second end.

In a particular embodiment of the array of the invention, the said first and second monolith are connected by the monolith bridge at the second end of the array.

In a particular embodiment of the array of the invention, the electrical connection between the first and second monolith by the monolith bridge is a coherent connection, wherein in the zones, where the bridge has been joined to the monoliths by the sintering or oxidizing treatment, the structure of the material is the same as that of the adjoining material in the monoliths and in the monolith bridge. Preferably, there is no apparent interface in said joining zones.

Alternatively, the term "coherently connected" may be defined as consistently intra-connected or consistently coupled.

In a particular embodiment of the array of the invention, the monolith bridge extends over less than 50%, preferably 40%, more preferably 30%, more preferably 20%, and most preferably 10%, of the length from the first to the second end of the first and second monoliths.

In a particular embodiment of the array of the invention, said array has been produced by a process of comprising the steps of
A) providing the electrically conductive materials of the first monolith, the second monolith and the monolith bridge in the form of two or three separate entities, wherein the surface areas to be connected is in a moldable state,
B) contacting the surface areas to be connected to form a continuous material phase in the contact areas,
C) joining the contact areas together by a method comprising a step of sintering or oxidizing treatment.

In a particular embodiment of the array of the invention, the conductive materials of the monoliths and the monoliths bridges are the same material.

In a particular embodiment of the array of the invention, at least one of the electrically conductive materials of the monoliths and the at least one monolith bridge is a composite of an electrically conductive metallic material and of a ceramic material. It has been found that with the said composite material, it is possible to obtain an increased resistivity as compared to a material consisting solely of an electrically conductive material. An increased resistivity allows for an increased heating of the material.

In a particular embodiment of the array of the invention, the resistivity of at least one of the electrically conductive materials of the monoliths and the monolith bridges is from $1 \times 10E-4$ Ohm×m to $1 \times 10E-7$ Ohm×m, preferably from $1 \times 10E-5$ Ohm×m to $1 \times 10E-7$ Ohm×m, more preferably from $1 \times 10E-5$ Ohm×m to $5 \times 10E-6$ Ohm×m, and most preferably from $5 \times 10E-5$ Ohm×m to $1 \times 10E-6$ Ohm×m.

In a particular embodiment of the array of the invention, the monolith bridge material is heat-resistant up to a temperature of at least 500° C., preferably at least 700° C., preferably at least 900° C., preferably at least 1000° C., and most preferably at least 1100° C.

The endothermic reaction to be catalyzed by the array of the invention may be any endothermic chemical reaction, for which catalysis is possible. In a particular embodiment of the array of the invention, the endothermic reaction is selected from the group consisting of steam methane reforming, hydrogen cyanide formation, methanol cracking, ammonia cracking, reverse water gas shift and dehydrogenation.

In a particular embodiment of the array of the invention, the monoliths have such a shape that the cross section in a plane perpendicular to said longitudinal axis is selected form the group consisting of a polygon, a regular polygon, a circle, a semi-circle, an oval, a semi-oval, a trapeze, and the monoliths may have the same or different shapes.

In a particular embodiment of the array of the invention, the monoliths have such a shape that the cross section in a plane perpendicular to said longitudinal axis is a regular polygon selected from a triangle, a rectangle, a pentagon, a hexagon, a heptagon, an octagon, a nonagon, a decagon, a hendecagon and a dodecagon. Preferably, the monoliths have the same shape and such a shape that the cross section in a plane perpendicular to said longitudinal axis is selected from the group consisting of a triangle, a rectangle and a hexagon.

In a particular embodiment of the array of the invention, the flow channels of the monoliths have such a shape that the cross section in a plane perpendicular to said longitudinal axis is selected from the group consisting of a polygon, a regular polygon, a circle, a semi-circle, an oval, a semi-oval, a trapeze, and the flow channels may have the same or different shapes within one monolith and/or between different monoliths.

In a particular embodiment of the array of the invention, the flow channels of the monoliths have such a shape that the cross section in a plane perpendicular to said longitudinal axis is a regular polygon selected from a triangle, a rectangle, a pentagon, a hexagon, a heptagon, an octagon, a nonagon, a decagon, a hendecagon and a dodecagon. Preferably, the flow channels of the monoliths have the same shape and such a shape that the cross section in a plane perpendicular to said longitudinal axis is selected from the group consisting of a triangle, a rectangle and a hexagon.

In a particular embodiment of the array of the invention, the array is configured to generate a heat flux of 500 to 50000 W/m$^2$ by resistance heating of the material.

In a particular embodiment of the array of the invention, the array has electrically insulating parts arranged to increase the length of a principal current path between said at least two conductors to a length larger than the largest dimension of the monolith. In a particular embodiment of the array of the invention, said insulating parts have the form of slits in at least one of the monoliths. Preferably, the said slits have a longitudinal direction perpendicular to the longitudinal direction of the monoliths. In a particular embodiment of the invention, the electrically insulating parts are in the form of air or a material with a high resistivity, such as a ceramic. Preferably, the ratio of the resistivity of the conductive material of the monolith to the resistivity of the insulating part to is at least 50, preferably at least 100, more preferably at least 200, more preferably at least 300, more preferably at least 400, more preferably at least 600, more preferably at least 800, and most preferably at least 1000.

In a particular embodiment of the array of the invention, said array has at least one electrically insulating part arranged to direct a current through said monoliths in order to ensure that for at least 70% of the length of said monoliths, a current density vector of the principal current path has a non-zero component value parallel to the length of said structured catalyst, i.e. parallel to the longitudinal axis of the monolith. Thus, for at least 70% of the length of the structured catalyst, the current density vector will have a positive or negative component value parallel to the length of the structured catalyst. Thus, for at least 70%, e.g. for 90% or 95%, of the length of structured catalyst, viz. along the z-axis of the structured catalyst, the current density vector of a principal current path will have a positive or negative value along the z-axis. This means that the current is forced from the first end of the structured catalyst towards the second end, and subsequently is forced towards the first end again. The temperature of the gas entering the first end of the structured catalyst and the endothermic steam reforming reaction taking place over the structured catalyst absorbs heat from the structured catalyst. For this reason, the first end of the structured catalyst remains colder than the second end, and by ensuring that the current density vector of the principal current path has a non-zero component value parallel to the length of said structured catalyst, this takes place with a substantially continuously increasing temperature profile, which gives a controllable reaction front. In an embodiment the current density vector has a non-zero component value parallel to the length of said structured catalyst in 70% of the length of said structured catalyst, preferably 80%, more preferably 90%, and even more preferably 95%. It should be noted that the term "the length of the structured catalyst" is meant to denote the dimension of the structured catalyst in the direction of the gas flow in the reactor unit housing the structured catalyst.

In a particular embodiment of the array of the invention, a supporting part is disposed in the space between juxtaposed monoliths, where the bridge is not present. The purpose of the supporting part is to support the array construction so as to avoid breakage or cracks from arising. In a particular embodiment of the array of the invention, the supporting part is composed of a material with a high resistivity, such as a ceramic. Preferably, the ratio of the resistivity of the conductive material of the monolith to the resistivity of the material of the supporting part is at least 50, preferably at least 100, more preferably at least 200, more preferably at least 300, more preferably at least 400, more preferably at least 600, more preferably at least 800, and most preferably at least 1000. In a particular embodiment of the invention, the supporting part extends over at least 50%, preferably at least 60%, more preferably at least 70%, more preferably at least 80%, and most preferably at least 90%, of the of the length from the first to the second end of the monoliths not occupied by the bridge.

In a particular embodiment of the array of the invention, the length of the feed gas passage through the array is less than the length of the passage of current from the first electrode through the array and to the second electrode.

In a particular embodiment of the array of the invention, the monolith bridge material is a material devoid of any space with a smallest dimension of 0.4 mm or more, preferably 0.6 mm or more, more preferably 0.8 mm or more, more preferably 1.0 mm or more, more preferably 1.2 mm or more, more preferably 1.4 mm or more, more preferably 1.6 mm or more, more preferably 1.8 mm or more, and most preferably 2.0 mm or more, formed therein.

In a particular embodiment of the array of the invention, at least one monolith is composed of at least two monolithic sections serially connected by a section bridge of an section bridge electrically conductive material. In a particular embodiment of the array of the invention, said one monolith is composed of at least three monolithic sections, preferably at least four monolithic sections, more preferably at least five monolithic sections, more preferably at least six monolithic sections, more preferably at least seven monolithic sections, and most preferably at least eight monolithic sections. In a particular embodiment of the array of the invention, said monolithic sections have different resistivities. In a particular embodiment of the array of the invention, said one monolith is composed of at least a first, a second and a third monolithic section positioned in sequence in the direction from the first to the second end, wherein the second monolithic section has a higher resistivity as compared to the first and third monolithic section, the third monolithic section has a lower resistivity as compared to the first and second monolithic section, and the first monolithic section has a resistivity in between the resistivity of the second and third composite material. Such design provides a temperature profile from the first end to the second end of the array, which is optimized for the catalysis of the endothermic reaction.

Process for Producing Array

In a particular embodiment of the array of the invention, said array has been produced by a process of comprising the steps of
- A) providing the electrically conductive materials of the first monolith, the second monolith and the monolith bridge in the form of two or three separate entities, wherein the surface areas to be connected is in a moldable state,
- B) contacting the surface areas to be connected to form a continuous material phase in the contact areas,
- C) joining the contact areas together by a method comprising a step of sintering or oxidizing treatment.

In a particular embodiment of the array of the invention, said array has been produced by a process of comprising the steps of:
- providing a first monolith component comprising metal powder with a first alloy composition and a first soluble binder, the first component having a first joining surface,
- providing a second monolith component comprising metal powder with a second alloy composition and a second soluble binder, the second component having a second joining surface;
- providing a bridge component comprising metal powder with a third alloy composition and a third soluble binder, the bridge component having two third joining surfaces, one at each end of the bridge component;
- wherein the first alloy composition and the second and third alloy compositions all consist of a plurality of chemical elements, and wherein the chemical elements are chosen so that, for each of the chemical elements being present in an amount higher than 0.5 weight % of the respective alloy composition, that chemical element is comprised both in the first and second and third alloy composition, and,
  - for the chemical elements being present in the first alloy composition in amounts of up to 5.0 weight %, the amount of that chemical element differs by at most 1 percentage point between the first alloy composition on the one hand and each of the second and third alloy compositions on the other hand, and
  - for the chemical elements being present in the first alloy composition in amounts of more than 5.0 weight %, the amount of that chemical element differs by at most 3 percentage point between the first alloy composition on the one hand and each of the second and third alloy compositions on the other hand,
- arranging the bridge component between the first monolith component and the second monolith component so that one third joining surface contacts the first joining surface and that the other third joining surface contacts the second joining surface,
- maintaining the joining surfaces in contact for a time period allowing for at least some evaporation of the solvent; and
- subsequently sintering or oxidizing the first, second and third components together while maintaining the joining surfaces in contact or as close together as possible in order to achieve the array.

In a particular embodiment of the above process, the following step precedes the step of arranging:
- at least partly dissolving the first joining surface and/or the second joining surface by applying a solvent.

In a particular embodiment of the above process, the first, second and third components are manufactured by powder extrusion, powder injection moulding, additive manufacturing, or tape casting.

In a particular embodiment of the above process, the metal alloy compositions of the first, second and third components comprise one or more of the following: iron, chromium, aluminium, cobalt, nickel, manganese, molybdenum, vanadium, silicon or an alloy thereof.

In a particular embodiment of the above process, the first, second and/or third component(s) comprises a ceramic material.

In a particular embodiment of the above process, the bridge component comprising dissolved binder and metal powder further comprises ceramic powder.

In a particular embodiment of the above process, the first binder, the second binder, and the third binder have similar or the same solvability, such as the first, second, and third binders being the same.

In a particular embodiment of the above process, the binders of the first, second and/or third component(s) is dissoluble by water.

In a particular embodiment of the above process, after sintering or oxidizing former interfaces between the first monolith component, the second monolith component and the bridge component cannot be identified by use of Scanning Electron Microscopy analysis.

In a particular embodiment of the above process, a plurality of monolith components and bridge components are joined together. In a particular embodiment of the above process, a plurality of monolith components and bridge components are joined together to produce an array with multiple monoliths and bridges in a desired configuration.

Array with Element for Alleviating Adverse Effects Caused by Hot Spot Formation

In a particular embodiment of the array of the invention, the array further comprises an element for alleviating adverse effects caused by hot spot formation selected from the group consisting of:
- (i) the two monoliths to be connected by the monolith bridge are disposed so as to form a center plane positioned through the geometric center of both of the two monoliths and positioned in the same direction as the longitudinal axis of the array, wherein the first and second monoliths have a first and a second width in the direction perpendicular to said center plane, wherein said monolith bridge has a width in the direction perpendicular to said center plane, and wherein the width of the monolith bridge is larger than said first and second widths,
- (ii) the monolith bridge has a larger cross-sectional area at one or both ends abutting the two monoliths to be connected than at the center point of the bridge,
- (iii) a safety bridge between monoliths, wherein the safety bridge comprises a safety bridge electrically conductive material having an electrical resistance, which is sufficient high so as to restrain current from running through the safety bridge when the monolith bridge is in operation, wherein the safety bridge is positioned at any point between the first and second end of the array;
- (iv) a protrusion on at least one of the first and second monolith for connecting the first and second conductor, respectively, wherein the protrusion is of a protrusion electrically conductive material;
- (v) the monolith bridge material has a lower electrical resistivity than the first electrically conductive material, (vi) the monolith bridge comprises at least a first and a second layer, wherein the first layer is positioned closer to the second end of the array than the second layer, and wherein the first layer has a lower electrical resistivity than the second layer.

As explained above, a structured catalyst of the type of the present invention has a number of constructions parts (spots), wherein the flow of electrical current passing through the catalyst become restricted, because the current is forced to pass through a narrow passage with a reduced cross section, e.g. at the second end of the structured catalyst, or to transfer from one section to another section, e.g. from one type of material to another or across an interface between the two sections. There is a risk that such spots, which are sometimes referred to as hot spots, become over-heated and in turn are structurally damaged to become partly or wholly nonfunctional. The elements (i) to (vi) as defined above each alleviate the risk of hot spot formation in different construction parts of the array of the invention.

In a particular embodiment of the array of the invention with alleviating element (i) as defined above, the two monoliths to be connected by the monolith bridge have a rectangular cross section in a plane perpendicular to said longitudinal axis and are arranged so as to have parallel surfaces, wherein said two monoliths each have a front surface facing the other monolith, a back surface parallel to the front surface and two side surfaces perpendicular to the front and back surfaces, wherein the monolith bridge comprises one or more of (A) a spacer section positioned between at least part of the front surfaces, (B) one or more side sections connected to at least part of one or more of the side surfaces, and (C) a back section connected to at least part of the back surface and connected to at least one side section.

In a particular embodiment of the array of the invention, the bridge has a form selected from the group consisting of an L-shaped body, an H-shaped body, a T-shaped body, an S-shaped body, an 8-shaped body, an O-shaped body, an F-formed body, an E-shaped body, and I-shaped body, two parallel linear bodies, and a rectangular frame body as viewed in the direction of the longitudinal axis of the array, and wherein the bridge has a uniform dimension in the direction of the longitudinal axis of the array. In a particular embodiment of the array of the invention, each section of said bodies has a rectangular cross section in a plane perpendicular to the surface of the monolith to which the section is connected. In a particular embodiment of the array of the invention, the side sections of the bridge each has a form of an elongated linear body with a longitudinal axis connecting the side surfaces of the two monoliths to be connected and having a rectangular cross-section in a direction perpendicular to its longitudinal direction. In a particular embodiment of the array of the invention, the side section extends from the back surface of one monolith to the back surface of the second monolith. In a particular embodiment of the array of the invention, the elongated linear body at the surface closest to the first end of the monolith has extensions connected to the side surfaces of the monoliths. Preferably, the extensions have the form of a rectangular box as viewed in a direction perpendicular to the side surface. Alternatively, the extensions have the form of a box with a triangular cross-section as viewed in a direction perpendicular to the side surface, wherein the triangle slopes from the back surface to the front surface.

In a particular embodiment of the array of the invention, the side sections of the bridge each has the form of an elongated body with a longitudinal axis connecting the side surfaces of the two monoliths to be connected and having a form as viewed from a direction perpendicular to the side surfaces with a straight line at the edge of the side section closest to the second end of the monoliths and with a curve in the form of an partial ellipse at the edge of the side section closest to the first end of the monoliths, wherein the curve in the form of an partial ellipse has a declining profile in a direction from the back surfaces towards the front surfaces of the monoliths.

In a particular embodiment of the array of the invention with alleviating element (vi) as defined above, the monolith bridge contains one or more intermediate layers of an electrically conductive material positioned between the first and second layer, wherein the intermediate layers have such electrical resistivities that the resistivity is at increasing levels from layer to layer from the first layer to the second layer.

In a particular embodiment of the array of the invention with alleviating element (vi) as defined above, the first layer has a lower resistivity than the resistivity of the first electrically conductive material, and the second layer has a higher resistivity than the first electrically conductive material.

Endothermic Reactions

In an embodiment, the endothermic reaction is dehydrogenation of hydrocarbons. This reaction takes place according to reaction (viii). The catalyst material for the reaction may be $Pt/Al_2O_3$ or $Pt—Sn/Al_2O_3$. The catalytically active material may be Pt. The maximum temperature of the reactor may be between 500-700° C. The pressure of the feed gas may be 2-5 bar.

In an embodiment, the endothermic reaction is cracking of methanol. This reaction takes place according to reaction (v), (ix), and (x). The catalyst material for the reaction may be $Ni/MgAl_2O_3$ or $Cu/Zn/Al_2O_3$. The catalytically active material may be Cu or Ni. The maximum temperature of the reactor may be between 200-300° C. The pressure of the feed gas may be 2-30 bar, preferably about 25 bar.

In an embodiment, the endothermic reaction is cracking of methanol. The catalyst material for the reaction may be CuZnO/Al2O3, Fe/Al2O3NiGa/MgAl2O4, or CuZn/ZrO2. The catalytically active material may be Cu, Zn, ZnO, Fe, Ga, Ni, or a combination thereof, while the ceramic coating may be Al2O3, ZrO2, MgAl2O3, CaAl2O3, or a combination therefore and potentially mixed with oxides of Y, Ti, La, or Ce. The maximum temperature of the reactor may be between 150-1300° C. The pressure of the feedstock may be 2-200 bar, preferably about 25 bar. In an embodiment said macroscopic structure is made of an alloy of Fe Cr Al, supporting a ceramic coating of a ZrO2 and $Al_2O_3$ mixture, with CuZn as catalytically active material. In another embodiment, said macroscopic structure is made of an alloy of Fe Cr Al, supporting a ceramic coating of a ZrO2 and MgAl2O4 mixture, with Ni as catalytically active material. In another embodiment, said macroscopic structure is made of an alloy of Fe Cr Al, supporting a ceramic coating of a ZrO2, with Mn as catalytically active material.

In an embodiment, the endothermic reaction is steam reforming of hydrocarbons. This reaction takes place according to reaction (i)-(v). The catalyst material for the reaction may be $Ni/Al_2O_3$, $Ni/MgAl_2O_3$, $Ni/CaAl_2O_3$, $Ru/MgAl_2O_3$, or $Rh/MgAl_2O_3$. The catalytically active material may be Ni, Ru, Rh, Ir, or a combination thereof. The maximum temperature of the reactor may be between 850-1300° C. The pressure of the feed gas may be 15-180 bar, preferably about 25 bar.

In an embodiment, the endothermic reaction is steam reforming of hydrocarbons. The catalyst material for the reaction may be Ni/Al2O3, Ni/ZrO2, Ni/MgAl2O3, Ni/CaAl2O3, Ru/MgAl2O3, or Rh/MgAl2O3. The catalytically active material may be Ni, Ru, Rh, Ir, or a combination thereof, while the ceramic coating may be Al2O3, ZrO2, MgAl2O3, CaAl2O3, or a combination therefore and potentially mixed with oxides of Y, Ti, La, or Ce. The maximum temperature of the reactor may be between 850-1300° C. The pressure of the feed gas may be 15-180 bar, preferably about 25 bar. In an embodiment said macroscopic structure is made of an alloy of Fe Cr Al, supporting a ceramic coating of a ZrO2 and MgAl2O4 mixture, with nickel as catalytically active material.

In an embodiment, the endothermic reaction is ammonia cracking. This reaction takes place according to reaction (xi). The catalyst material for the reaction may be Fe, FeCo, or Ru/Al$_2$O$_3$. The catalytically active material may be Fe or Ru. The maximum temperature of the reactor may be between 400-700° C. The pressure of the feed gas may be 2-30 bar, preferably about 25 bar.

In an embodiment, the endothermic reaction is ammonia cracking. The catalyst material for the reaction may be Fe (prepared from Fe3O4 or FeO), FeCo, Ru/Al2O3, Ru/ZrO2, Fe/Al2O3, FeCo/Al2O3, Ru/MgAl2O3, or CoSn/Al2O3. The catalytically active material may be Ru, Rh, Fe, Co, Ir, Os, or a combination thereof, while the ceramic coating may be Al2O3, ZrO2, MgAl2O3, CaAl2O3, or a combination therefore and potentially mixed with oxides of Y, Ti, La, or Ce. The maximum temperature of the reactor may be between 300-1300° C. The pressure of the feed gas may be 2-180 bar, preferably about 25 bar. In an embodiment said macroscopic structure is made of an alloy of Fe Cr Al, supporting a ceramic coating of a ZrO2 and Al2O3 mixture, with Ru as catalytically active material.

In an embodiment, the endothermic reaction is the hydrogen cyanide synthesis or a synthesis process for organic nitriles. This reaction takes place according to reaction (vi) and (vii). The catalyst material for the reaction may be Pt/Al$_2$O$_3$. The catalytically active material may be Pt, Co, or SnCo. The maximum temperature of the reactor may be between 700-1200° C. The pressure of the feed gas may be 2-30 bar, preferably about 5 bar.

In an embodiment, the endothermic reaction is the hydrogen cyanide synthesis or a synthesis process for organic nitriles. The catalyst material for the reaction may be Pt/Al2O3, Pt/ZrO2, Ru/Al2O3, Rh/Al2O3, Pt/MgAl2O4, or CoSn/Al2O3. The catalytically active material may be Pt, Ru, Rh, Ir, Co, Sn, or a combination thereof, while the ceramic coating may be Al$_2$O$_3$, ZrO2, MgAl2O4, CaAl2O4, or a combination therefore and potentially mixed with oxides of Y, Ti, La, or Ce. The maximum temperature of the reactor may be between 850-1300° C. The pressure of the feed gas may be 2-180 bar, preferably about 25 bar. In an embodiment said macroscopic structure is made of an alloy of Fe Cr Al, supporting a ceramic coating of a ZrO2 and Al2O3 mixture, with Pt as catalytically active material.

In an embodiment, the endothermic reaction is aromatization of hydrocarbons. This is advantageously aromatization of higher hydrocarbons.

Reactor of the Invention

The invention further relates to a reactor system for carrying out an endothermic reaction of a feed gas, said reactor system comprising:

a) a catalyst of the present invention or an array of the invention;
b) a pressure shell housing said catalyst, said pressure shell comprising an inlet for letting in said feed gas and an outlet for letting out product gas, wherein said inlet is positioned so that said feed gas enters said catalyst in a first end and said product gas exits said catalyst from a second end; and
c) a heat insulation layer between said structured catalyst and said pressure shell.

Use of the Catalyst of the Invention

The present invention further relates to the use of the catalyst according to the invention, the array of the invention or the reactor of the invention, wherein the endothermic reaction is selected from the group consisting of steam methane reforming, hydrogen cyanide formation, methanol cracking, ammonia cracking, reverse water gas shift and dehydrogenation.

Items of the Invention

1. A structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material at least partly is a composite in the form of a homogenous mixture of an electrically conductive metallic material and a ceramic material, wherein the macroscopic structure at least partly is composed of two or more materials with different resistivities.

2. Catalyst according to item 1, wherein the macroscopic structure at least partly is composed of one or more composite materials and one or more non-composite electrically conductive metallic materials.

3. Catalyst according to any of items 1-2, wherein the metallic material is an alloy comprising one or more substances selected from the group consisting of Fe, Cr, Al, Co, Ni, Zr, Cu, Ti, Mn, and Si.

4. Catalyst according to any of items 1-3, wherein the ceramic material is an oxide of a substance selected from the group consisting of Al, Mg, Ce, Zr, Ca, Y and La.

5. Catalyst according to any of items 1-4, wherein the ratio based on weight of metallic material to ceramic material in the macroscopic structure is in the range of from 50 to 1, preferably from 40 to 1, more preferably from 30 to 2, more preferably from 24 to 3, and most preferably from 19 to 4.

6. Catalyst according to any of items 2-5, wherein the structured catalyst has the form of at least one monolith, wherein the monolith has a number of flow channels formed therein for conveying said feed gas through the monoliths from a first end, where the feed gas enters, to a second end, where a product gas exits, wherein said monolith has a longitudinal axis extending form said first end to said second end.

7. Catalyst according to item 6, wherein the macroscopic structure of the monolith is composed of two or more composite materials with different compositions positioned in the direction of said longitudinal axis so as provide different resistivities.

8. Catalyst according to item 7, wherein the macroscopic structure of the monolith is composed of at least, three composite materials, preferably at least four composite materials, more preferably at least five composite materials, more preferably at least six composite materials, more preferably at least seven composite materials, and most preferably at least eight composite materials.

9. Catalyst according to item 8, wherein the macroscopic structure of the monolith comprises at least a first, a second and a third composite material positioned in the direction from the first to the second end, wherein the second composite material has a higher resistivity as compared to the first and third composite material, the third composite material has a lower resistivity as compared to the first and second composite material, and the first composite material has a resistivity in between the resistivity of the second and third composite material.

10. Catalyst according to item 6, wherein the macroscopic structure of the monolith is composed of one or more composite materials with different compositions and a non-composite electrically conductive metallic material positioned in the direction of said longitudinal axis so as provide different resistivities.

11. Catalyst according to item 10, wherein the macroscopic structure of the monolith comprises at least a first and a second composite material and a non-composite electrically conductive metallic material positioned in the direction from the first to the second end, wherein the second composite material has a higher resistivity as compared to the first composite material and the non-composite material, the non-composite material has a lower resistivity as compared to the first and second composite material, and the first composite material has a resistivity in between the resistivity of the second composite material and the resistivity of the non-composite material.

12. Array comprising a first and a second structured catalyst according to any of items 1-11, wherein:
   a) the first and second structured catalyst have the form of a first and second monolith, respectively;
   b) each of said first and second monoliths has a number of flow channels formed therein for conveying said feed gas through the monoliths from a first end, where the feed gas enters, to a second end, where a product gas exits, wherein each of said first and second monoliths has a longitudinal axis extending from said first end to said second end;
   c) the array comprises at least a first and a second conductor electrically connected to said first and second monoliths, respectively, and configured to be connected to an electrical power supply, wherein said electrical power supply is dimensioned to heat at least part of said first and second monoliths to a temperature of at least 500° C. by passing an electrical current through said macroscopic structure, wherein said first conductor is electrically connected directly or indirectly to the first monolith and the second conductor is electrically connected directly or indirectly to the second monolith, and wherein the conductors are connected at positions on the array closer to said first end than to said second end,
   d) said first and second monolith are electrically connected by a monolith bridge of a monolith bridge electrically conductive material,
   e) the array is configured to direct an electrical current to run from the first conductor through the first monolith to said second end, then through the bridge, and then through the second monolith to the second conductor, and
   f) said array has been produced by a process comprising the steps of
   i) providing the electrically conductive materials of the first monolith, the second monolith and the monolith bridge in the form of three separate entities, and
   ii) joining the separate entities together by a method comprising a step of sintering or oxidizing treatment.

13. Array according to item 12, wherein the second conductor is connected directly to the second monolith.

14. Array according to item 13, wherein the second conductor is indirectly electrically connected to the second monolith.

15. Array according to item 14, wherein the array further comprises (i) one or more juxtaposed additional intermediate monoliths of a structured catalyst and (ii) one end monolith of a structured catalyst, wherein each additional intermediate monolith is connected to at least two juxtaposed monoliths by a monolith bridge of a monolith bridge electrically conductive material, and wherein the end monolith is connected to at least one juxtaposed monolith, and wherein the second conductor is connected to the end monolith at a position on the monolith closer to said first end than to said second end.

16. Array according to item 15, wherein the total number of the additional intermediate monoliths and the end monolith is an even integer, and wherein the second conductor is connected to the end monolith at the first end of the array.

17. Array according to item 16, wherein the first and second monolith are connected by the monolith bridge at the second end of the array, wherein each additional intermediate monolith is serially connected to two juxtaposed monoliths by a monolith bridge of a monolith bridge electrically conductive material alternately at said first end and at said second end so as to direct the current from one end to the opposite end of each monolith, and wherein the end monolith is connected to one juxtaposed monolith at the second end.

18. Array according to any of items 12-17, wherein the said first and second monolith are connected by the monolith bridge at the second end of the array.

19. Array according to any of items 12-18, wherein the monolith bridge extends over less than 50%, preferably 40%, more preferably 30%, more preferably 20%, and most preferably 10%, of the length from the first to the second end of the first and second monoliths.

20. Array according to any of items 12-19, wherein said array has been produced by a process of comprising the steps of
   A) providing the electrically conductive materials of the first monolith, the second monolith or the intermediate monolith and the monolith bridge in the form of three separate entities, wherein the surface areas to be connected are in a moldable state,
   B) contacting the surface areas to be connected in the contact areas,
   C) joining the contact areas together by a method comprising a step of sintering or oxidizing treatment.

21. Array according to any of items 12-20, wherein said array has been produced by a process of comprising the steps of:
   providing a first monolith component comprising metal powder with a first alloy composition and a first soluble binder, the first component having a first joining surface,
   providing a second monolith component comprising metal powder with a second alloy composition and a second soluble binder, the second component having a second joining surface;

providing a bridge component comprising metal powder with a third alloy composition and a third soluble binder, the bridge component having two third joining surfaces, one at each end of the bridge component;

wherein the first alloy composition and the second and third alloy compositions all consist of a plurality of chemical elements, and wherein the chemical elements are chosen so that, for each of the chemical elements being present in an amount higher than 0.5 weight % of the respective alloy composition, that chemical element is comprised both in the first and second and third alloy composition, and for the chemical elements being present in the first alloy composition in amounts of up to 5.0 weight %, the amount of that chemical element differs by at most 1 percentage point between the first alloy composition on the one hand and each of the second and third alloy compositions on the other hand, and for the chemical elements being present in the first alloy composition in amounts of more than 5.0 weight %, the amount of that chemical element differs by at most 3 percentage point between the first alloy composition on the one hand and each of the second and third alloy compositions on the other hand, arranging the bridge component between the first monolith component and the second monolith component so that one third joining surface contacts the first joining surface and that the other third joining surface contacts the second joining surface, maintaining the joining surfaces in contact for a time period allowing for at least some evaporation of the solvent; and subsequently sintering or oxidizing the first, second and third components together while maintaining the joining surfaces in contact or as close together as possible in order to achieve the array.

22. Array according to item 21, wherein the following step precedes the step of arranging:

at least partly dissolving the first joining surface and/or the second joining surface by applying a solvent.

23. Array according to any of items 15-22, wherein the conductive materials of the monolith bridges are the same material.

24. Array according to any of items 15-23, wherein the conductive material of the monolith bridges at the second end of the array are the same material.

25. Array according to any of items 12-24, wherein the conductive materials of the monoliths and the monoliths bridges are the same material.

26. Array according to any items 12-25, wherein at least one of the electrically conductive materials of the monoliths and of the at least one monolith bridge is a composite of an electrically conductive metallic material and a ceramic material.

27. Array according to any of items 12-26, wherein the resistivity of at least one of the electrically conductive materials of the monoliths and the monolith bridges is from $1\times10E-4$ Ohm×m to $1\times10E-7$ Ohm×m, preferably from $1\times10E-5$ Ohm×m to $1\times10E-7$ Ohm×m, more preferably from $1\times10E-5$ Ohm×m to $5\times10E-6$ Ohm×m, and most preferably from $5\times10E-5$ Ohm×m to $1\times10E-6$ Ohm×m.

28. Array according to any of items 12-27, wherein the monolith bridge material is heat-resistant up to a temperature of at least 500° C., preferably at least 700° C., preferably at least 900° C., preferably at least 1000° C., and most preferably at least 1100° C.

29. Array according to any of items 12-28, wherein the endothermic reaction is selected from the group consisting of steam methane reforming, hydrogen cyanide formation, methanol cracking, ammonia cracking, reverse water gas shift and dehydrogenation.

30. Array according to any of items 12-29, wherein the monoliths have such a shape that the cross section in a plane perpendicular to said longitudinal axis is selected form the group consisting of a polygon, a regular polygon, a circle, a semi-circle, an oval, a semi-oval, a trapeze, and wherein the monoliths may have the same or different shapes.

31. Array according to item 30, wherein the monoliths have such a shape that the cross section in a plane perpendicular to said longitudinal axis is a regular polygon selected from a triangle, a rectangle, a pentagon, a hexagon, a heptagon, an octagon, a nonagon, a decagon, a hendecagon and a dodecagon.

32. Array according to any of items 12-31, wherein the array further comprises an element for alleviating adverse effects caused by hot spot formation selected from the group consisting of:

(i) the two monoliths connected by the monolith bridge are disposed so as to form a center plane positioned through the geometric center of both of the two monoliths and positioned parallel to the longitudinal axis of the array, wherein the first and second monoliths have a first and a second width in the direction perpendicular to said center plane, wherein said monolith bridge has a width in the direction perpendicular to said center plane, and wherein the width of the monolith bridge is larger than said first and second widths, (ii) the monolith bridge has a larger cross-sectional area at one or both ends abutting the two monoliths to be connected than at the center point of the bridge, (iii) a safety bridge between monoliths, wherein the safety bridge comprises a safety bridge electrically conductive material having an electrical resistance, which is sufficient high so as to restrain current from running through the safety bridge when the monolith bridge is in operation, wherein the safety bridge is positioned at any point between the first and second end of the array;

(iv) a protrusion on at least one of the first and second monolith for connecting the first and second conductor, respectively, wherein the protrusion is of a protrusion electrically conductive material;

(v) the monolith bridge material has a lower electrical resistivity than the first electrically conductive material, (vi) the monolith bridge comprises at least a first and a second layer, wherein the first layer is positioned closer to the second end of the array than the second layer, and wherein the first layer has a lower electrical resistivity than the second layer.

33. Array according to item 32 (i), the two monoliths to be connected by the monolith bridge have a rectangular cross section in a plane perpendicular to said longitudinal axis and are arranged so as to have parallel surfaces, wherein said two monoliths each have a front surface facing the other monolith, a back surface parallel to the front surface and two side surfaces perpendicular to the front and back surfaces, wherein the monolith bridge comprises one or more of (A) a spacer section positioned between at least part of the front surfaces, (B) one or more side sections connected to at least part of one or more of the side surfaces, and (C) a back section connected to at least part of the back surface and connected to at least one side section.

34. Array according to item 33, wherein the bridge has a form selected from the group consisting of an L-shaped body, an H-shaped body, a T-shaped body, an S-shaped body, an 8-shaped body, an O-shaped body, an F-formed body, an E-shaped body, and I-shaped body, two parallel linear bodies, and a rectangular frame body as viewed in the direction of the longitudinal axis of the array, and wherein the bridge has a uniform dimension in the direction of the longitudinal axis of the array.

35. Array according to item 34, wherein each section of said bodies has a rectangular cross section in a plane perpendicular to the surface of the monolith to which the section is connected.

36. Array according to item 33, wherein the side sections of the bridge each has a form of an elongated linear body with a longitudinal axis connecting the side surfaces of the two monoliths to be connected and having a rectangular cross-section in a direction perpendicular to its longitudinal direction.

37. Array according to item 35 or 36, wherein the side section extends from the back surface of one monolith to the back surface of the second monolith.

38. Array according to any of items 35-37, wherein the elongated linear body at the surface closest to the first end of the monolith has extensions connected to the side surfaces of the monoliths.

39. Array according to item 38, wherein the extensions have the form of a rectangular box as viewed in a direction perpendicular to the side surface.

40. Array according to item 39, wherein the extensions have the form of a box with a triangular cross-section as viewed in a direction perpendicular to the side surface, wherein the triangle slopes from the back surface to the front surface.

41. Array according to item 33, wherein the side sections of the bridge each has the form of an elongated body with a longitudinal axis connecting the side surfaces of the two monoliths to be connected and having a form as viewed from a direction perpendicular to the side surfaces with a straight line at the edge of the side section closest to the second end of the monoliths and with a curve in the form of an partial ellipse at the edge of the side section closest to the first end of the monoliths, wherein the curve in the form of an partial ellipse has a declining profile in a direction from the back surfaces towards the front surfaces of the monoliths.

42. Array according to item 32 (vi), wherein the monolith bridge contains one or more intermediate layers of an electrically conductive material positioned between the first and second layer, wherein the intermediate layers have such electrical resistivities that the resistivity is at increasing levels from layer to layer from the first layer to the second layer.

43. Array according to item 32 (vi), wherein the first layer has a lower resistivity than the resistivity of the first electrically conductive material, and wherein the second layer has a higher resistivity than the first electrically conductive material.

44. Array according to any of items 12-43, wherein the array is configured to generate a heat flux of 500 to 50000 W/m² by resistance heating of the material.

45. Array according to any of items 12-44, wherein the array has electrically insulating parts arranged to increase the length of a principal current path between said at least two conductors to a length larger than the largest dimension of the monolith.

46. Array according to any of items 12-45, wherein said array has at least one electrically insulating part arranged to direct a current through said monoliths in order to ensure that for at least 70% of the length of said monoliths, a current density vector of the principal current path has a non-zero component value parallel to the length of said structured catalyst.

47. Array according to any of items 12-46, wherein the length of the feed gas passage through the array is less than the length of the passage of current from the first electrode through the array and to the second electrode.

48. Array according to any of items 12-47, wherein the monolith bridge material is a material devoid of any space with a smallest dimension of 0.4 mm or more, preferably 0.6 mm or more, more preferably 0.8 mm or more, more preferably 1.0 mm or more, more preferably 1.2 mm or more, more preferably 1.4 mm or more, more preferably 1.6 mm or more, more preferably 1.8 mm or more, and most preferably 2.0 mm or more, formed therein.

49. Array according to any of items 12-48, wherein the flow channels of the monoliths have such a shape that the cross section in a plane perpendicular to said longitudinal axis is selected from the group consisting of a polygon, a regular polygon, a circle, a semi-circle, an oval, a semi-oval, a trapeze, and wherein the flow channels may have the same or different shapes within one monolith and/or between different monoliths.

50. Array according to item 49, wherein the flow channels of the monoliths have such a shape that the cross section in a plane perpendicular to said longitudinal axis is a regular polygon selected from a triangle, a rectangle, a pentagon, a hexagon, a heptagon, an octagon, a nonagon, a decagon, a hendecagon and a dodecagon.

51. A reactor system for carrying out an endothermic reaction of a feed gas, said reactor system comprising:
   a) a catalyst of any of item 1-11 or the array of any of items 12-50;
   b) a pressure shell housing said array, said pressure shell comprising an inlet for letting in said feed gas and an outlet for letting out product gas, wherein said inlet is positioned so that said feed gas enters said array in a first end and said product gas exits said array from a second; and
   c) a heat insulation layer between said structured catalyst and said pressure shell.

52. Use of the catalyst according to any of items 1-11 or the array of any of items 12-50 or the reactor system of item 51, wherein the endothermic reaction is selected from the group consisting of steam methane reforming, hydrogen cyanide formation, methanol cracking, ammonia cracking, reverse water gas shift and dehydrogenation.

Points of the Invention

1. A structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material is a composite in the form of a homogenous mixture of an electrically conductive metallic material and a ceramic material.

1.1. Catalyst according to point 1 wherein the electrically conductive material is a composite comprising different materials having different compositions, wherein one or more of the compositions comprise metallic material and ceramic material, and wherein the different materials are positioned in a way so as to provide varying resistivity in the direction of a longitudinal axis of the macroscopic structure of the monolith.

2. Catalyst according to point 1, wherein the metallic material is an alloy comprising one or more substances selected from the group consisting of Fe, Cr, Al, Co, Ni, Zr, Cu, Ti, Mn, and Si.

3. Catalyst according to any of points 1-2, wherein the ceramic material is an oxide of a substance selected from the group consisting of Al, Mg, Ce, Zr, Ca, Y and La.

4. Catalyst according to any of point 1-3, wherein the ratio based on weight of metallic material to ceramic material in the macroscopic structure is in the range of from 50 to 1, preferably from 40 to 1, more preferably from 30 to 2, more preferably from 24 to 3, and most preferably from 19 to 4.

5. Catalyst according to point 1 or any of points 2-4, wherein the structured catalyst has the form of at least one monolith, wherein the monolith has a number of flow channels formed therein for conveying said feed gas through the monoliths from a first end, where the feed gas enters, to a second end, where a product gas exits, wherein said monolith has a longitudinal axis extending form said first end to said second end.

6. Catalyst according to point 5, wherein the macroscopic structure of the monolith is composed of two or more composite materials with different compositions positioned in the direction of said longitudinal axis so as provide different resistivities.

6.1 Catalyst according to any of the points 1 to 5, wherein the macroscopic structure of the monolith comprises more than one composite materials comprising different compositions, wherein different compositions are positioned in the direction of the longitudinal axis of the monolith so as to provide different resistivities changing along the longitudinal axis of the monolith.

6.2. The macroscopic structure of the monolith of any of points above, manufactured from a plurality of pastes of different compositions may constitute a composite component itself resulting from different materials of each of the pastes. In such an embodiment, macroscopic structure of the monolith is a composite comprising different materials resulted from different compositions of the pastes, wherein one or more of the pastes may have a composition different than the other, and wherein the different materials are positioned in a way so as to provide varying resistivity in the direction of a longitudinal axis of the macroscopic structure of the monolith.

6.3. In an embodiment, the macroscopic structure of the monolith according to any of points above may comprise at least partly one or more alloys and at least partly one or more alloys with ceramic particles, resulting from different compositions used to prepare plurality of pastes, wherein different parts are positioned in the direction of said longitudinal axis, as described in the method of producing the monolith.

7. Catalyst according to point 6, wherein the macroscopic structure of the monolith is composed of at least, three composite materials, preferably at least four composite materials, more preferably at least five composite materials, more preferably at least six composite materials, more preferably at least seven composite materials, and most preferably at least eight composite materials.

8. Catalyst according to point 7, wherein the macroscopic structure of the monolith comprises at least a first, a second and a third composite material positioned in the direction from the first to the second end, wherein the second composite material has a higher resistivity as compared to the first and third composite material, the third composite material has a lower resistivity as compared to the first and second composite material, and the first composite material has a resistivity in between the second and third composite material.

9. Array comprising a first and a second structured catalyst according to any of points 1-8 wherein:
  a) the first and second structured catalyst have the form of a first and a second monolith respectively
  b) each of said first and second monoliths has a number of flow channels formed therein for conveying said feed gas through the monoliths from a first end, where the feed gas enters, to a second end, where a product gas exits, wherein each of said first and second monoliths has a longitudinal axis extending from said first end to said second end;
  c) the array comprises at least a first and a second conductor electrically connected to said first and second monoliths, respectively, and configured to be connected to an electrical power supply, wherein said electrical power supply is dimensioned to heat at least part of said first and second monoliths to a temperature of at least 500° C. by passing an electrical current through said macroscopic structure, wherein said first conductor is electrically connected directly or indirectly to the first monolith and the second conductor is electrically connected directly or indirectly to the second monolith, and wherein the conductors are connected at positions on the array closer to said first end than to said second end,
  d) said first and second monolith are electrically connected by a monolith bridge of a monolith bridge electrically conductive material,
  e) the array is configured to direct an electrical current to run from the first conductor through the first monolith to said second end, then through the bridge, and then through the second monolith to the second conductor, and
  f) said array has been produced by a process comprising the steps of
  i) providing the electrically conductive materials of the first monolith, the second monolith and the monolith bridge in the form of three separate entities, and
  ii) joining the separate entities together by a method comprising a step of sintering or oxidizing treatment.

10. Array according to point 9, wherein the second conductor is connected directly to the second monolith.

11. Array according to point 9, wherein the second conductor is indirectly electrically connected to the second monolith.

12. Array according to point 10 or 11, wherein the array further comprises (i) one or more juxtaposed additional intermediate monoliths of a structured catalyst and (ii) one end monolith of a structured catalyst, wherein each additional intermediate monolith is connected to at least two juxtaposed monoliths by a monolith bridge of a monolith bridge electrically conductive material, and wherein the end monolith is connected to at least one juxtaposed monolith, and wherein the second conductor is connected to the end monolith at a position on the monolith closer to said first end than to said second end.

13. Array according to item 12, wherein the total number of the additional intermediate monoliths and the end monolith is an even integer, and wherein the second conductor is connected to the end monolith at the first end of the array.

14. Array according to point 13, wherein the first and second monolith are connected by the monolith bridge at the second end of the array, wherein each additional intermediate monolith is serially connected to two juxtaposed monoliths by a monolith bridge of a monolith bridge electrically conductive material alternately at said first end and at said second end so as to direct the current from one end to the opposite end of each monolith, and wherein the end monolith is connected to one juxtaposed monolith at the second end.

15. Array according to any of points 9-14, wherein the said first and second monolith are connected by the monolith bridge at the second end of the array.

16. Array according to any of points 9-15, wherein the monolith bridge extends over less than 50%, preferably 40%, more preferably 30%, more preferably 20%, and most preferably 10%, of the length from the first to the second end of the first and second monoliths.

17. Array according to any of points 9-16, wherein said array has been produced by a process of comprising the steps of
A) providing the electrically conductive materials of the first monolith, the second monolith and the monolith bridge in the form of three separate entities, wherein the surface areas to be connected are in a moldable state,
B) contacting the surface areas to be connected in the contact areas,
C) joining the contact areas together by a method comprising a step of sintering or oxidizing treatment.

When there are one or more intermediate monoliths and an end monolith in addition to the first and second monoliths of the array, the array may still be produced by the above process, wherein the three separate entities in these cases are any two of the juxtaposed monoliths and a monolith bridge in between them.

18. Array according to any of points 9-17, wherein said array has been produced by a process of comprising the steps of:
providing a first monolith component comprising metal powder with a first alloy composition and a first soluble binder, the first component having a first joining surface,
providing a second monolith component comprising metal powder with a second alloy composition and a second soluble binder, the second component having a second joining surface;
providing a bridge component comprising metal powder with a third alloy composition and a third soluble binder, the bridge component having two third joining surfaces, one at each end of the bridge component;
wherein the first alloy composition and the second and third alloy compositions all consist of a plurality of chemical elements, and wherein the chemical elements are chosen so that, for each of the chemical elements being present in an amount higher than 0.5 weight % of the respective alloy composition, that chemical element is comprised both in the first and second and third alloy composition, and
for the chemical elements being present in the first alloy composition in amounts of up to 5.0 weight %, the amount of that chemical element differs by at most 1 percentage point between the first alloy composition on the one hand and each of the second and third alloy compositions on the other hand, and
for the chemical elements being present in the first alloy composition in amounts of more than 5.0 weight %, the amount of that chemical element differs by at most 3 percentage point between the first alloy composition on the one hand and each of the second and third alloy compositions on the other hand,
arranging the bridge component between the first monolith component and the second monolith component so that one third joining surface contacts the first joining surface and that the other third joining surface contacts the second joining surface,
maintaining the joining surfaces in contact for a time period allowing for at least some evaporation of the solvent; and
subsequently sintering or oxidizing the first, second and third components together while maintaining the joining surfaces in contact or as close together as possible in order to achieve the array.

19. Array according to point 18, wherein the following step precedes the step of arranging:
at least partly dissolving the first joining surface and/or the second joining surface by applying a solvent.

20. Array according to any of points 12-19, wherein the conductive materials of the monolith bridges are the same material.

21. Array according to any of points 12-19, wherein the conductive material of the monolith bridges at the second end of the array are the same material.

22. Array according to any of points 9-21, wherein the conductive materials of the monoliths and the monolith bridges are the same material.

23. Array according to any points 9-22, wherein at least one of the electrically conductive materials of the monoliths and of the at least one monolith bridge is a composite of an electrically conductive metallic material and a ceramic material.

24. Array according to any of items 9-23, wherein the resistivity of at least one of the electrically conductive materials of the monoliths and the monolith bridges is from $1 \times 10E-4$ Ohm×m to $1 \times 10E-7$ Ohm×m, preferably from $1 \times 10E-5$ Ohm×m to $1 \times 10E-7$ Ohm×m, more preferably from $1 \times 10E-5$ Ohm×m to $5 \times 10E-6$ Ohm×m, and most preferably from $5 \times 10E-5$ Ohm×m to $1 \times 10E-6$ Ohm×m.

25. Array according to any of points 9-24, wherein the monolith bridge material is heat-resistant up to a temperature of at least 500° C., preferably at least 700° C., preferably at least 900° C., preferably at least 1000° C., and most preferably at least 1100° C.

26. Array according to any of points 9-25, wherein the endothermic reaction is selected from the group consisting of steam methane reforming, hydrogen cyanide formation, methanol cracking, ammonia cracking, reverse water gas shift and dehydrogenation.

27. Array according to any of points 9-26, wherein the monoliths have such a shape that the cross section in a plane perpendicular to said longitudinal axis is selected form the group consisting of a polygon, a regular polygon, a circle, a semi-circle, an oval, a semi-oval, a trapeze, and wherein the monoliths may have the same or different shapes.

28. Array according to point 27, wherein the monoliths have such a shape that the cross section in a plane perpendicular to said longitudinal axis is a regular polygon selected from a triangle, a rectangle, a pentagon, a hexagon, a heptagon, an octagon, a nonagon, a decagon, a hendecagon and a dodecagon.

29. Array according to any of points 9-28, wherein the array further comprises an element for alleviating adverse effects caused by hot spot formation selected from the group consisting of:
(i) the two monoliths connected by the monolith bridge are disposed so as to form a center plane positioned through the geometric center of both of the two monoliths and positioned parallel to the longitudinal axis of the array, wherein the first and second monoliths have a first and a second width in the direction perpendicular to said center plane, wherein said monolith bridge has a width in the direction perpendicular to said center plane, and wherein the width of the monolith bridge is larger than said first and second widths, (ii) the monolith bridge has a larger cross-sectional area at one or both ends abutting the two monoliths to be connected than at the center point of the bridge, (iii) a safety bridge between monoliths, wherein the safety bridge comprises a safety bridge electrically conductive material having an electrical resistance, which is sufficient high so as to restrain current from running through the safety bridge when the monolith bridge is in operation, wherein the safety bridge is positioned at any point between the first and second end of the array;

(iv) a protrusion on at least one of the first and second monolith for connecting the first and second conductor, respectively, wherein the protrusion is of a protrusion electrically conductive material;

(v) the monolith bridge material has a lower electrical resistivity than the first electrically conductive material, (vi) the monolith bridge comprises at least a first and a second layer, wherein the first layer is positioned closer to the second end of the array than the second layer, and wherein the first layer has a lower electrical resistivity than the second layer.

30. Array according to point 29 (i), the two monoliths to be connected by the monolith bridge have a rectangular cross section in a plane perpendicular to said longitudinal axis and are arranged so as to have parallel surfaces, wherein said two monoliths each have a front surface facing the other monolith, a back surface parallel to the front surface and two side surfaces perpendicular to the front and back surfaces, wherein the monolith bridge comprises one or more of (A) a spacer section positioned between at least part of the front surfaces, (B) one or more side sections connected to at least part of one or more of the side surfaces, and (C) a back section connected to at least part of the back surface and connected to at least one side section.

31. Array according to point 30, wherein the bridge has a form selected from the group consisting of an L-shaped body, an H-shaped body, a T-shaped body, an S-shaped body, an 8-shaped body, an O-shaped body, an F-formed body, an E-shaped body, and I-shaped body, two parallel linear bodies, and a rectangular frame body as viewed in the direction of the longitudinal axis of the array, and wherein the bridge has a uniform dimension in the direction of the longitudinal axis of the array.

32. Array according to point 31, wherein each section of said bodies has a rectangular cross section in a plane perpendicular to the surface of the monolith to which the section is connected.

33. Array according to point 30, wherein the side sections of the bridge each has a form of an elongated linear body with a longitudinal axis connecting the side surfaces of the two monoliths to be connected and having a rectangular cross-section in a direction perpendicular to its longitudinal direction.

34. Array according to point 32 or 33, wherein the side section extends from the back surface of one monolith to the back surface of the second monolith.

35. Array according to any of points 32-34, wherein the elongated linear body at the surface closest to the first end of the monolith has extensions connected to the side surfaces of the monoliths.

36. Array according to point 35, wherein the extensions have the form of a rectangular box as viewed in a direction perpendicular to the side surface.

37. Array according to point 36, wherein the extensions have the form of a box with a triangular cross-section as viewed in a direction perpendicular to the side surface, wherein the triangle slopes from the back surface to the front surface.

38. Array according to point 30, wherein the side sections of the bridge each has the form of an elongated body with a longitudinal axis connecting the side surfaces of the two monoliths to be connected and having a form as viewed from a direction perpendicular to the side surfaces with a straight line at the edge of the side section closest to the second end of the monoliths and with a curve in the form of an partial ellipse at the edge of the side section closest to the first end of the monoliths, wherein the curve in the form of an partial ellipse has a declining profile in a direction from the back surfaces towards the front surfaces of the monoliths.

39. Array according to point 29 (vi), wherein the monolith bridge contains one or more intermediate layers of an electrically conductive material positioned between the first and second layer, wherein the intermediate layers have such electrical resistivities that the resistivity is at increasing levels from layer to layer from the first layer to the secand layer.

40. Array according to point 29 (vi), wherein the first layer has a lower resistivity than the resistivity of the first electrically conductive material, and wherein the second layer has a higher resistivity than the first electrically conductive material.

41. Array according to any of points 9-40, wherein the array is configured to generate a heat flux of 500 to 50000 W/m$^2$ by resistance heating of the material.

42. Array according to any of points 9-41, wherein the array has electrically insulating parts arranged to increase the length of a principal current path between said at least two conductors to a length larger than the largest dimension of the monolith.

43. Array according to any of points 9-42, wherein said array has at least one electrically insulating part arranged to direct a current through said monoliths in order to ensure that for at least 70% of the length of said monoliths, a current density vector of the principal current path has a non-zero component value parallel to the length of said structured catalyst.

44. Array according to any of points 9-43, wherein the length of the feed gas passage through the array is less than the length of the passage of current from the first electrode through the array and to the second electrode.

45. Array according to any of points 9-44, wherein the monolith bridge material is a material devoid of any space with a smallest dimension of 0.4 mm or more, preferably 0.6 mm or more, more preferably 0.8 mm or more, more preferably 1.0 mm or more, more preferably 1.2 mm or more, more preferably 1.4 mm or more, more preferably 1.6 mm or more, more preferably 1.8 mm or more, and most preferably 2.0 mm or more, formed therein.

46. Array according to any of points 9-45, wherein the flow channels of the monoliths have such a shape that the cross section in a plane perpendicular to said longitudinal axis is selected from the group consisting of a polygon, a regular polygon, a circle, a semi-circle, an oval, a semi-oval, a trapeze, and wherein the flow channels may have the same or different shapes within one monolith and/or between different monoliths.

47. Array according to point 46, wherein the flow channels of the monoliths have such a shape that the cross section in a plane perpendicular to said longitudinal axis is a regular polygon selected from a triangle, a rectangle, a pentagon, a hexagon, a heptagon, an octagon, a nonagon, a decagon, a hendecagon and a dodecagon.

48. A reactor system for carrying out an endothermic reaction of a feed gas, said reactor system comprising:
  a) a catalyst of any of points 1-8, or the array of any of the points 9-47;
  b) a pressure shell housing said array, said pressure shell comprising an inlet for letting in said feed gas and an outlet for letting out product gas, wherein said inlet is positioned so that said feed gas enters said array in a first end and said product gas exits said array from a second; and
  c) a heat insulation layer between said structured catalyst and said pressure shell.

49. Use of the catalyst according to any of points 1-8, or the array of any of the points 9-47, or the reactor system of point 48, wherein the endothermic reaction is selected from the group consisting of steam methane reforming, hydrogen cyanide formation, methanol cracking, ammonia cracking, reverse water gas shift and dehydrogenation.

When a former point is referred back to, it also means referring back to any of the subpoints of the corresponding point.

SHORT DESCRIPTION OF THE FIGURES

FIG. 1 shows a perspective view of an array of the invention comprising two monoliths and a monolith bridge.

FIG. 2 a perspective view of an array of the invention comprising four monoliths and three monolith bridges.

DETAILED DESCRIPTION OF THE FIGURES

Figure 1:
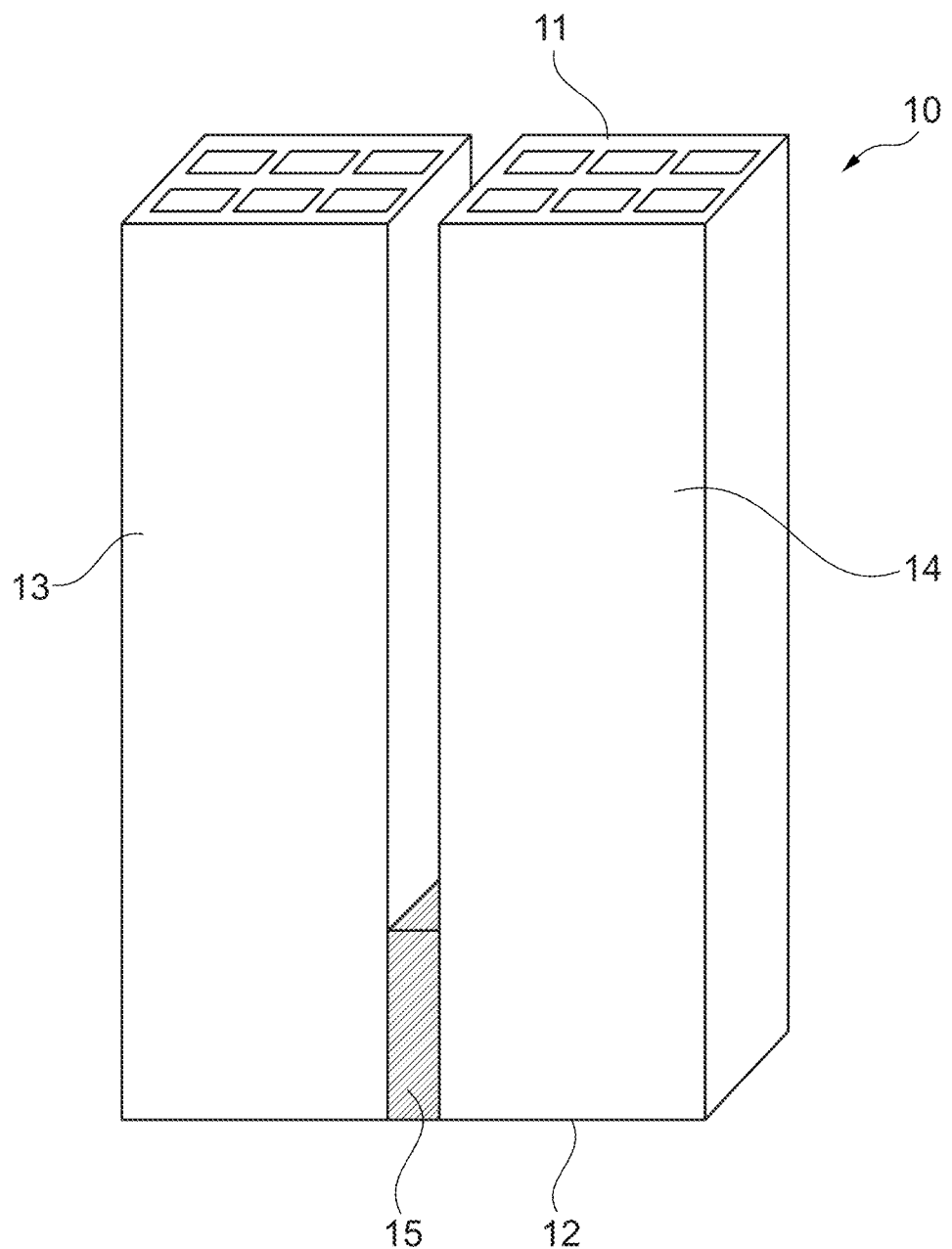

FIG. 1 shows an array 10 of the invention with a first end 11 and a second end 12 comprising a first monolith 13 and a second monolith 14 and a monolith bridge 15 connecting the first and second monoliths 13 and 14. The first and second monoliths 13 and 14 are in the form of a structured catalyst comprising a macroscopic structure of an electrically conductive material, said macroscopic structure supporting a ceramic coating, wherein said ceramic coating supports a catalytically active material. The monolith bridge is made of an electrically conductive material.

The first and second monoliths 13 and 14 are connected to a first and second conductor (not shown) connected to an external electrical power supply (not shown). The first and second monoliths 13 and 14 and the monolith bridge 15 enable heating thereof when connected to the external electrical power supply.

The first and second monoliths 13 and 14 have flow channels formed therein extending from the first end 11 to the second end 12 of the array 10 and adapted for leading a feed gas through the array 10 from the first end 11 to the second end 12 to heat the feed gas while exposing it to the catalyst. The monolith bridge 15 is devoid of any flow channels, i.e. it is constituted by a material with a continuous structure.

Figure 2:
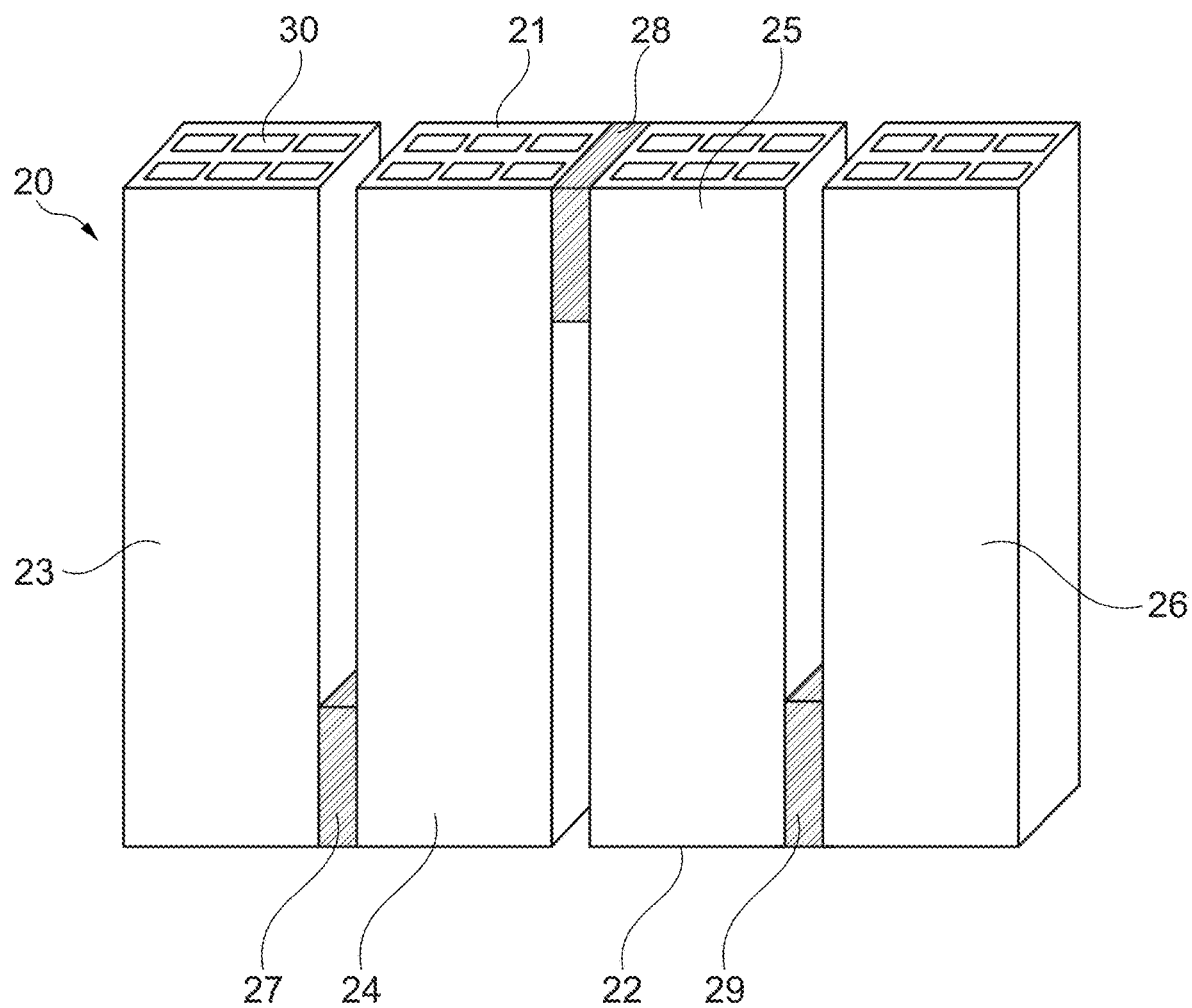

FIG. 2 shows an array 20 of the invention with a first end 21 and a second end 22 comprising a first monolith 23, a second monolith 24, an intermediate monolith 25, an end monolith 26, a monolith bridge 27 at the second end 22 of the array between the first and second monoliths 23 and 24, a monolith bridge 28 at the first end 21 of the array between the second monolith 24 and the intermediate monolith 25 and a monolith bridge 29 at the second end 22 of the array between the intermediate monolith 25 and the end monolith 26. The monoliths 23, 24, 25 and 26 have flow channels 30 formed therein extending from the first end 21 to the second end 22 of the array 20 and adapted for leading a feed gas through the array 20 from the first end 21 to the second end 22. The monolith bridges 27, 28 and 29 are devoid of any flow channels, i.e. it is constituted by material with a uniform structure.

Figure 3:
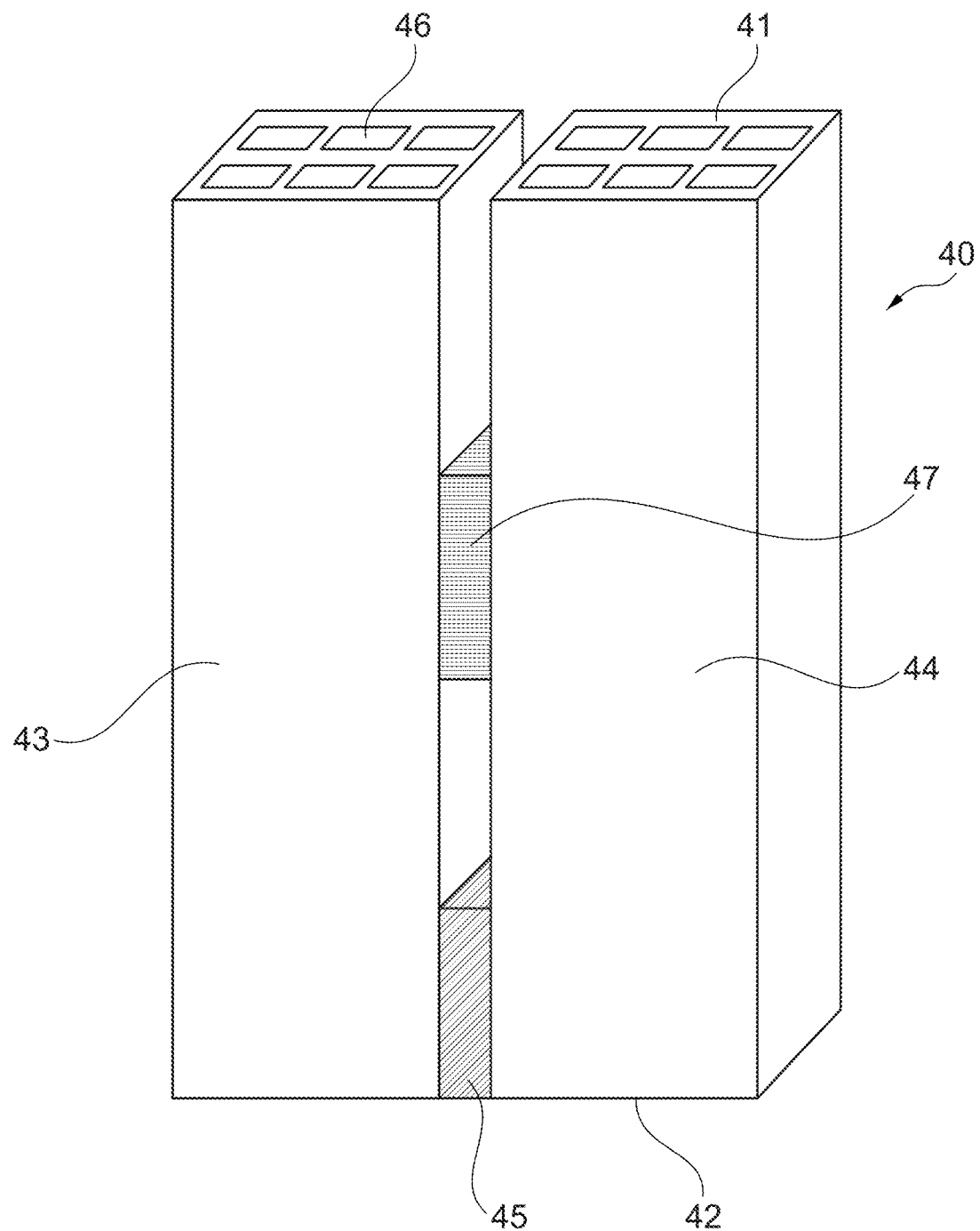
FIG. 3 shows a perspective view of an array of the invention comprising two monoliths, a monolith bridge and a safety bridge.

FIG. 3 shows an array 40 of the invention with a first end 41 and a second end 42 comprising a first monolith 43 and a second monolith 44 and monolith bridge 45 connecting the first and second monoliths 43 and 44. The first and second monoliths 43 and 44 have flow channels 46 formed therein extending from the first end 41 to the second end 42 of the array 40 and adapted for leading a feed gas through the array 40 from the first end 41 to the second end 42. The monolith bridge 45 is devoid of any flow channels, i.e. it is constituted by a material with a uniform structure.

The array 40 also comprises a safety bridge 47 of a conductive material with a resistivity, which is sufficiently high to prevent or strongly reduce passing of current therethrough when the monolith bridge 45 is operational for passing of current therethrough. However, in case the monolith bridge 45 becomes non-operational, e.g. due to damage, current will pass through the safety bridge 47 to ensure continued operation of the array.

Figure 4:
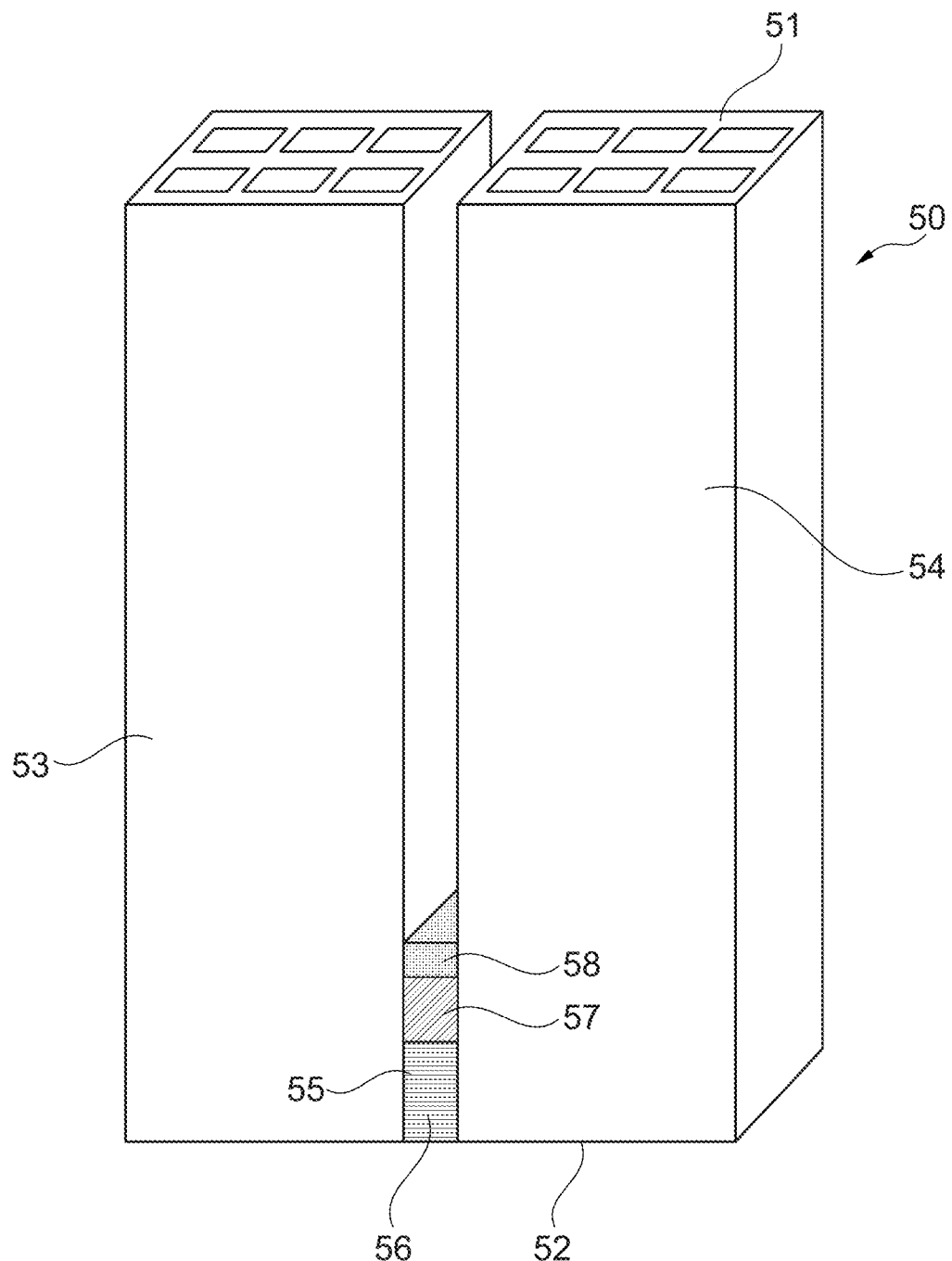
FIG. 4 shows a perspective view of an array of the invention comprising two monoliths and a monolith bridge with 3 layers.

FIG. 4 shows an array 50 of the invention with a first end 51 and a second end 52 comprising a first monolith 53 and a second monolith 54 and monolith bridge 55 connecting the first and second monoliths 53 and 54. The first and second monoliths 53 and 54 have flow channels formed therein extending from the first end 51 to the second end 52 of the array 50 and adapted for leading a feed gas through the array 50 from the first end 51 to the second end 52. The monolith bridge 55 is devoid of any flow channels, i.e. it is constituted by a material with uniform structure.

The monolith bridge 55 is composed of three layers of an electrically conductive material comprising a first layer 56, an intermediate layer 57 and a second layer 58. The conductivity of the first layer 56 is higher than the conductivity of the first and second monoliths 53 and 54. The conductivity of the intermediate layer 57 is lower than the conductivity of the first and second monoliths 53 and 54. The conductivity of the second layer 58 is lower than the conductivity of the intermediate layer 57. The level of conductivity in the three layers 56, 57 and 58 are selected so that the current passing from the first to the second monolith is approximately evenly distributed between the three layers.

To help further obtain such evenly distribution of current between the three layers 56, 57 and 58, the thickness of layer 56 is higher than that of layer 57, and the thickness of layer 57 is higher than that of layer 58.

This configuration of the monolith bridge ensures a relative low current density in the monolith bridge and thereby reduces the risk of hot spots.

Figure 5:
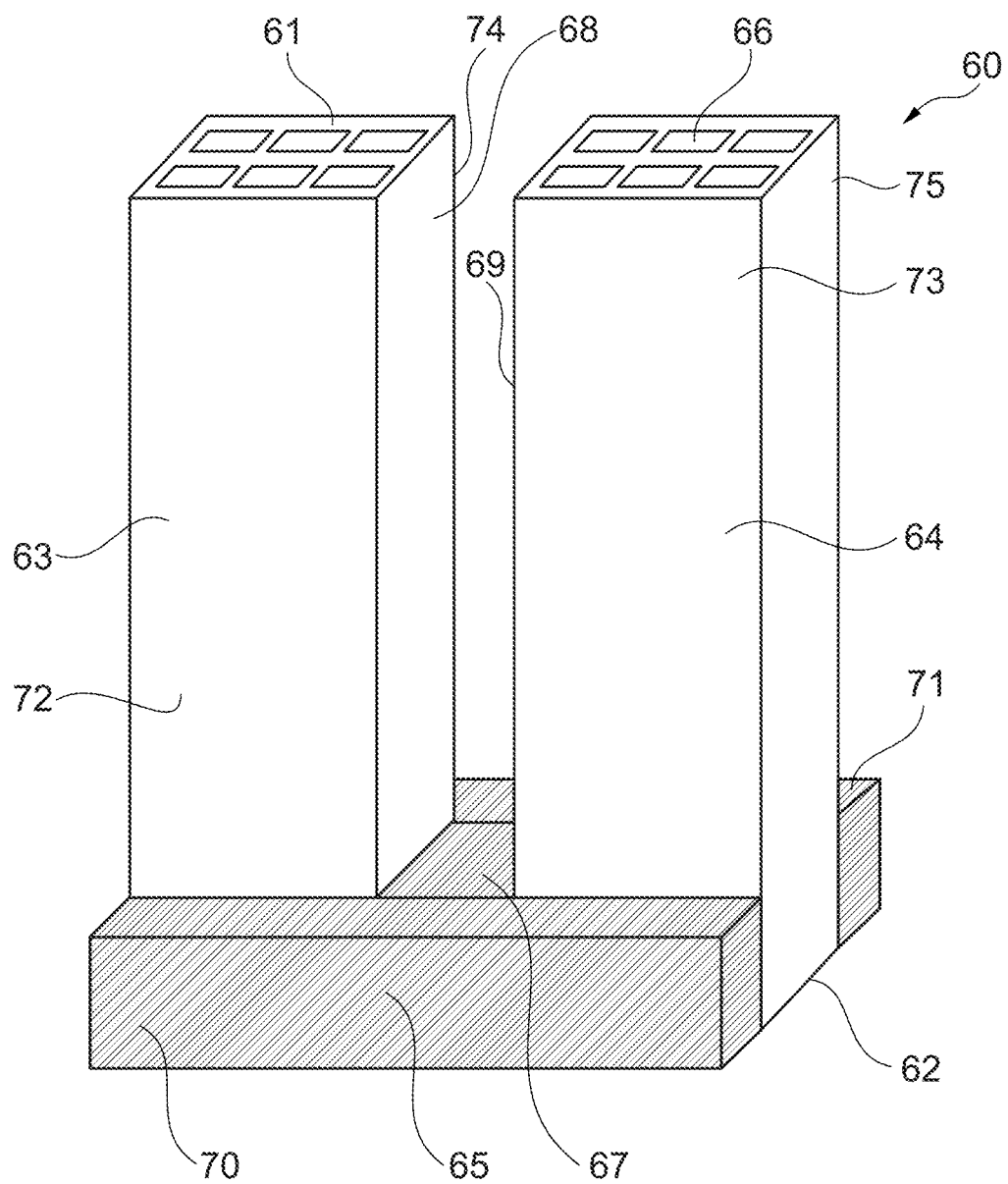
FIG. 5 shows a perspective view of an array of the invention comprising two monoliths and a monolith bridge in the form of an H.

FIG. 5 shows an array 60 of the invention with a first end 61 and a second end 62 comprising a first monolith 63 and a second monolith 64 and monolith bridge 65 connecting the first and second monoliths 63 and 64. The first and second monoliths 63 and 64 have flow channels 66 formed therein extending from the first end 61 to the second end 62 of the array 60 and adapted for leading a feed gas through the array 60 from the first end 61 to the second end 62. The monolith bridge 65 is devoid of any flow channels, i.e. it is constituted by a material with uniform structure.

The first and second monoliths 63 and 64 have a quadratic cross section and are arranged so as to have parallel surfaces. The monolith bridge 65 is composed of a bridge in the form of a H-shaped box comprising a spacer section 67 with a quadratic cross section disposed between the two front surfaces 68 and 69 of the first and second monoliths 63 and 64 facing each other and two linear sections 70 and 71 with a quadratic cross section, wherein section 70 is connected to the side surfaces 72 and 73 of one side of the monoliths 63 and 64 and to the side surfaces of the spacer section 67, and wherein section 71 is connected to the side surfaces 74 and 75 of the opposite side of the monoliths 63 and 64 and to the side surfaces of the spacer section 67.

The electrical current running from the first monolith 63 to the second monolith 64 will run partly through the spacer section 67 and partly through the linear sections 70 and 71. Thus, the H-shaped bridge provides an increased cross section for the current to run through and hence a reduced current density and a reduced heating of the bridge, which in turn reduces the risk of hot spots from occurring.

Figure 6:
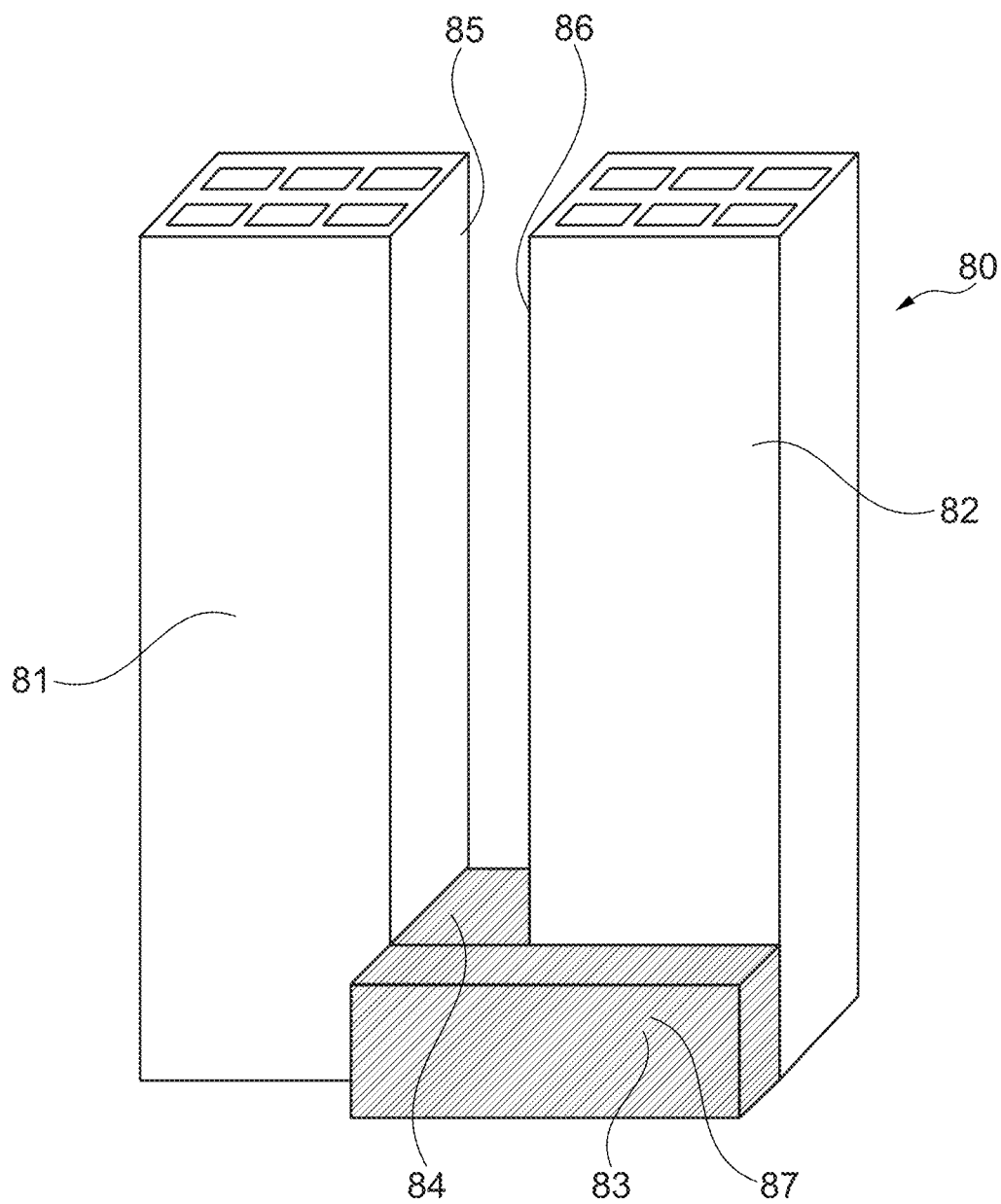
FIG. 6 shows a perspective view of an array of the invention comprising two monoliths and a monolith bridge in the form of an L.

FIG. 6 shows an array 80 comprising a first monolith 81 and a second monolith 82 and a monolith bridge 83 connecting the first and second monoliths 81 and 82. The first and second monoliths 81 and 82 have a quadratic cross section and are arranged so as to have parallel surfaces. The monolith bridge 83 is composed of a bridge in the form of an L-shaped box comprising a spacer section 84 with a quadratic cross section disposed between the two front surfaces 85 and 86 of the first and second monoliths 81 and 82 facing each other and one linear section 87 with a quadratic cross section, wherein section 87 is connected to the side surface 88 on one side of the monolith 82 and to a side surface of the spacer section 84.

The electrical current running from the first monolith 81 will run partly through the spacer section 84 directly into the second monolith 82 and partly through the spacer section 84 into the linear section 87 and then into the second monolith 82. Thus, the L-shaped bridge provides an increased cross section for the current to run through and hence a reduced current density and a reduced heating of the bridge, which in turn reduces the risk of hot spots from occurring.

Figure 7:
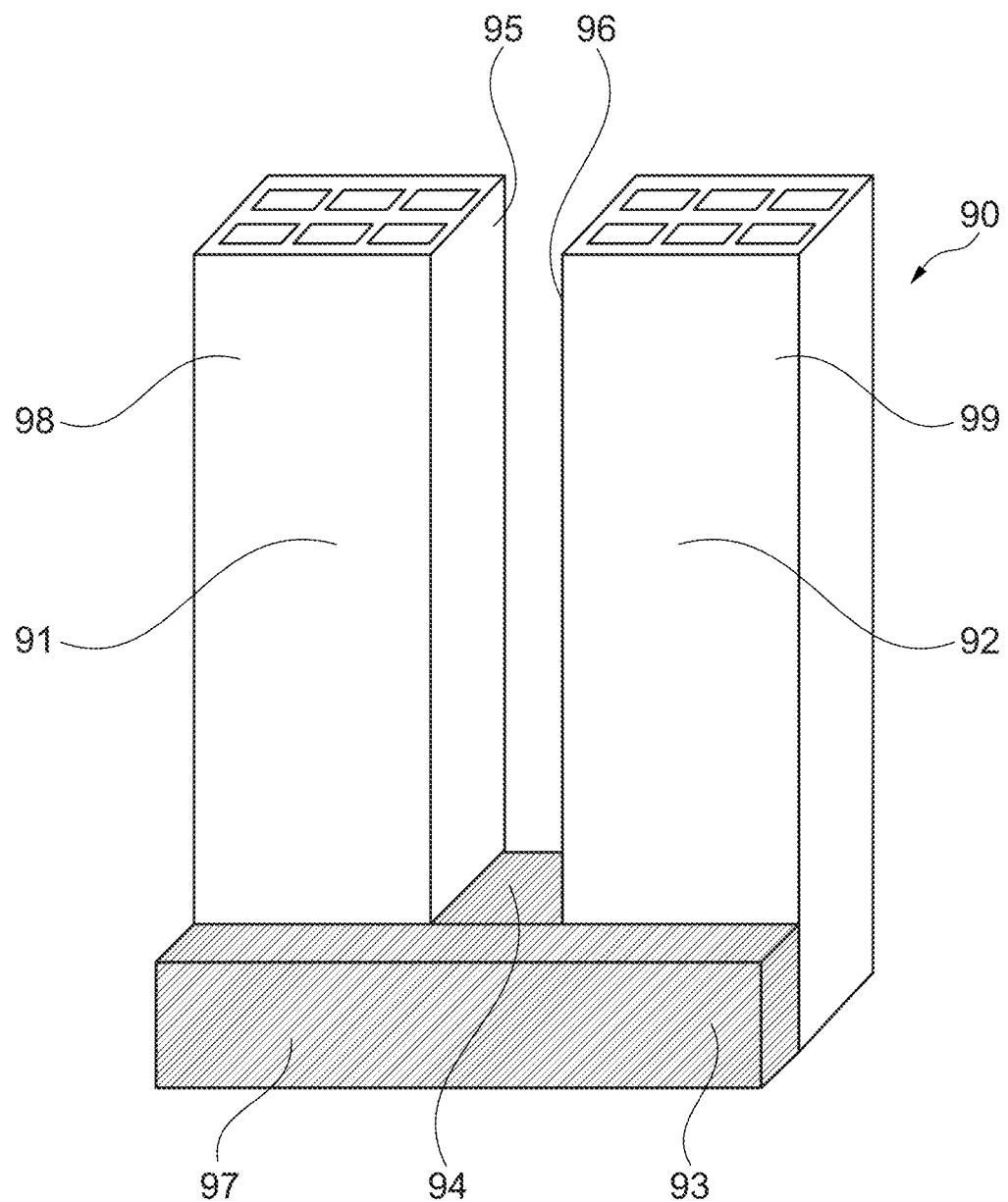
FIG. 7 shows a perspective view of an array of the invention comprising two monoliths and a monolith bridge in the form of an T.

FIG. 7 shows an array 90 comprising a first monolith 91 and a second monolith 92 and a monolith bridge 93 connecting the first and second monoliths 91 and 92. The first and second monoliths 91 and 92 have a quadratic cross section and are arranged so as to have parallel surfaces. The monolith bridge 93 is composed of a bridge in the form of a T-shaped box comprising a spacer section 94 with a quadratic cross section disposed between the two front surfaces 95 and 96 of the first and second monoliths 91 and 92 facing each other and one linear section 97 with a quadratic cross section, wherein section 97 is connected to the two side surfaces 98 and 99 on one side of the monoliths 91 and 92 and to a side surface of the spacer section 94.

The electrical current running from the first monolith 91 to the second monolith 92 will run partly through the spacer section 94 and partly through the linear section 97. Thus, the T-shaped bridge provides an increased cross section for the current to run through and hence a reduced current density and a reduced heating of the bridge, which in turn reduces the risk of hot spots from occurring.

Figure 8:
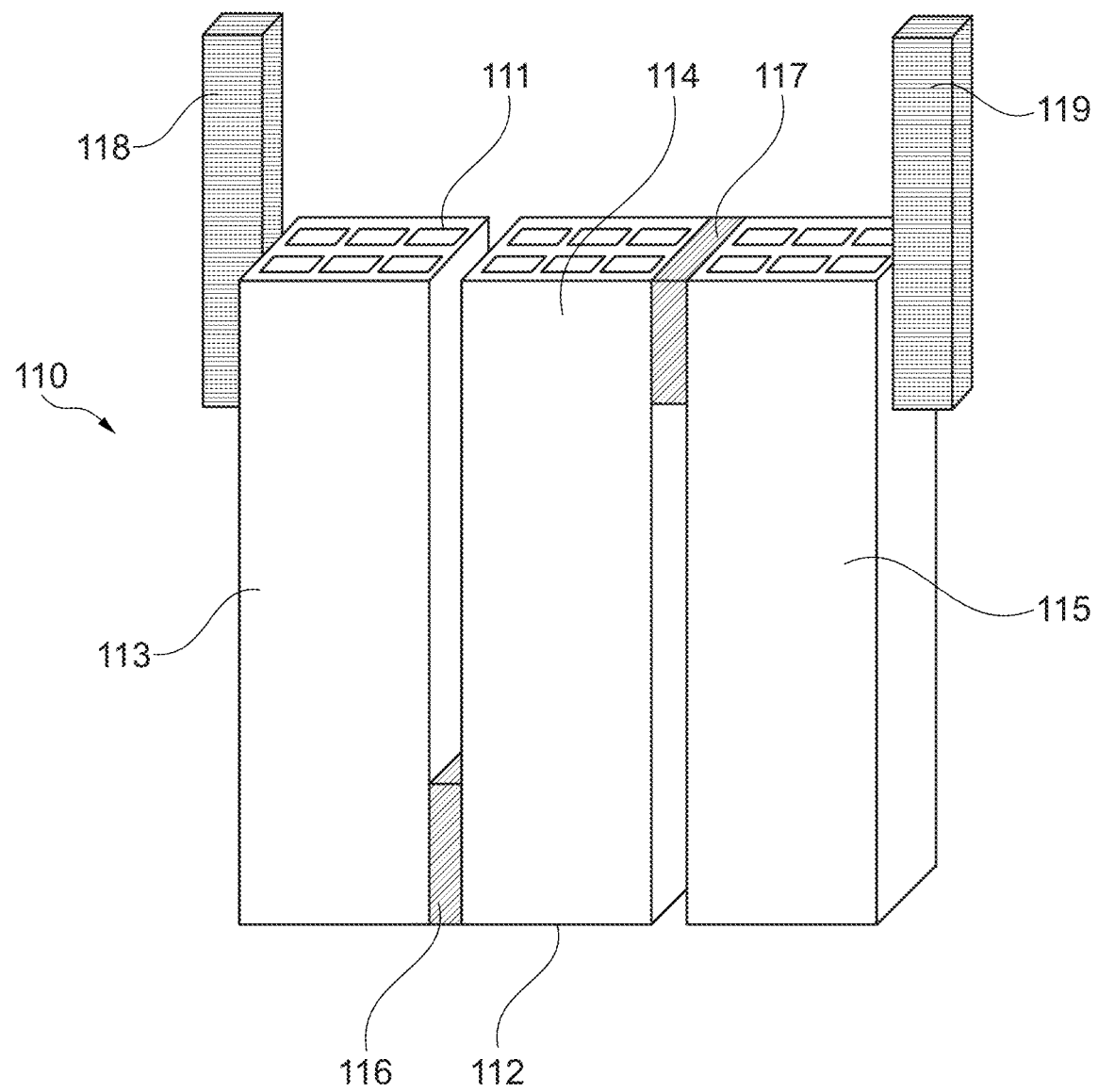
FIG. 8 shows a perspective view of an array of the invention comprising three monoliths.

FIG. 8 shows an array 110 with a first end 111 and a second end 112 comprising a first monolith 113, a second monolith 114 and an end monolith 115. The first monolith 113 is connected to the second monolith 114 with a monolith bridge 116 at the second end of the array. The second monolith 114 is connected to the end monolith 115 with a monolith bridge 117 at the first end of the array. A first conductor 118 is connected to the first end 111 of the first monolith 113 and a second conductor 119 is connected to the first end 111 of the end monolith 115. In this embodiment, the end monolith will be heated by the gas passing through it.

Figure 9:
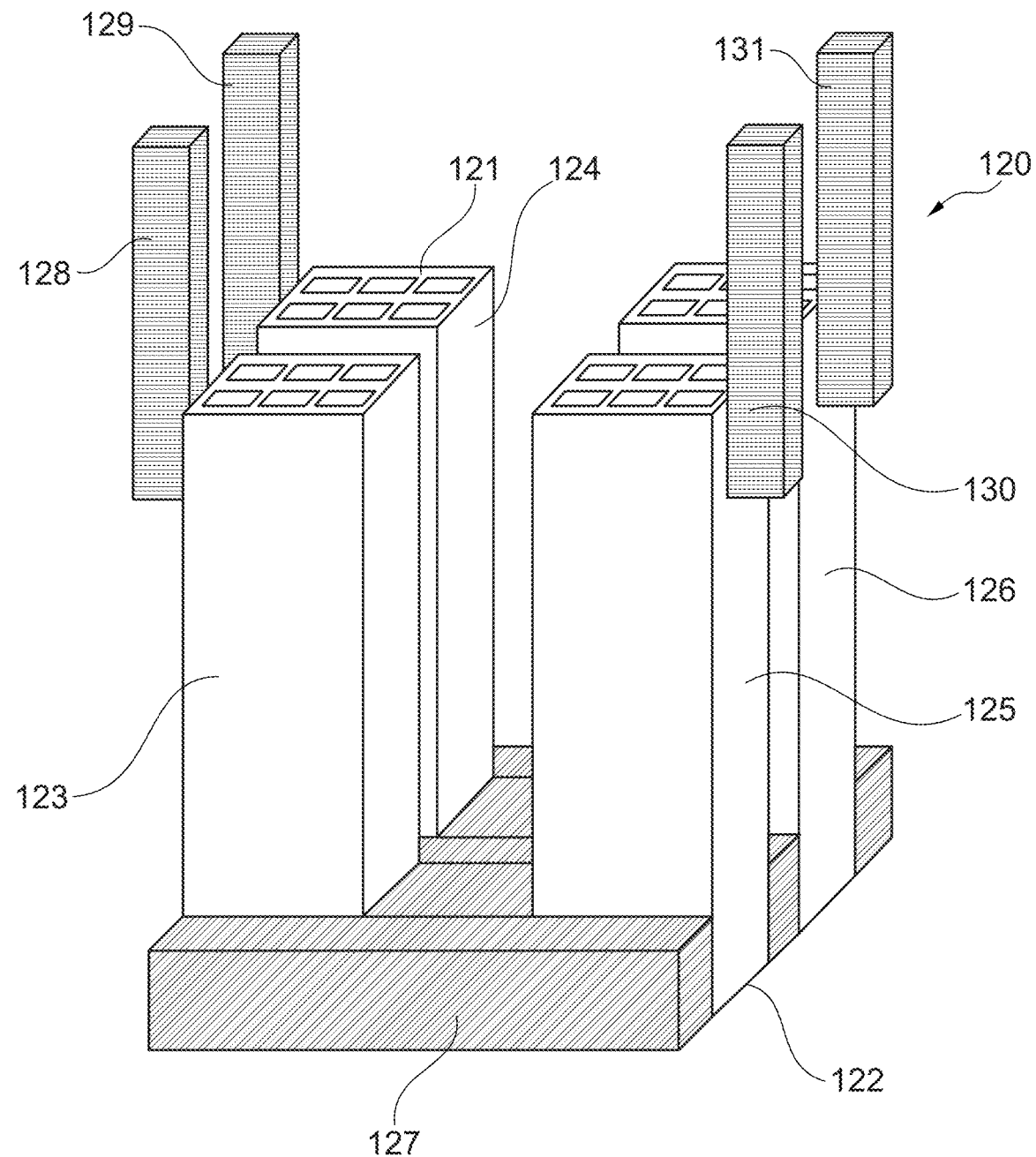
FIG. 9 shows a perspective view of an array of the invention comprising four monoliths and a monolith bridge at the second end of the array in the form of a continuous layer surround three sides of all four monoliths.

FIG. 9 shows an array 120 with a first end 121 and a second end 122 comprising two first monoliths 123 and 124 and two end monoliths 125 and 126. All four monoliths are connected at the second end by a monolith bridge 127 in the form of a layer surrounding three sides of all four monoliths. First conductors 128 and 129 are connected to the first end 121 of the first monoliths 123 and 124 and second conductors 130 and 131 are connected to the first end 121 of the end monoliths 125 and 126.

By means of conductor 128 electrical current is lead to the first monoliths 123 and through the bridge 127 to end monoliths 125 and 126. Likewise, by means of conductor 129 electrical current is lead to the first monoliths 124 and through the bridge 127 to end monoliths 125 and 126. Such a construction may be referred to as a parallel coupling. The array 120 has the advantage that in case one of the units consisting of conductor and monolith becomes defective during use hence preventing current from running therethrough, the array will continue to be functional and the operation of the reactor using the array for carrying out an endothermic reaction will not be interrupted. Also, the parallel coupling of array 120 is advantageous in that it is capable of handling 3 phase energy supply.

Figure 10:
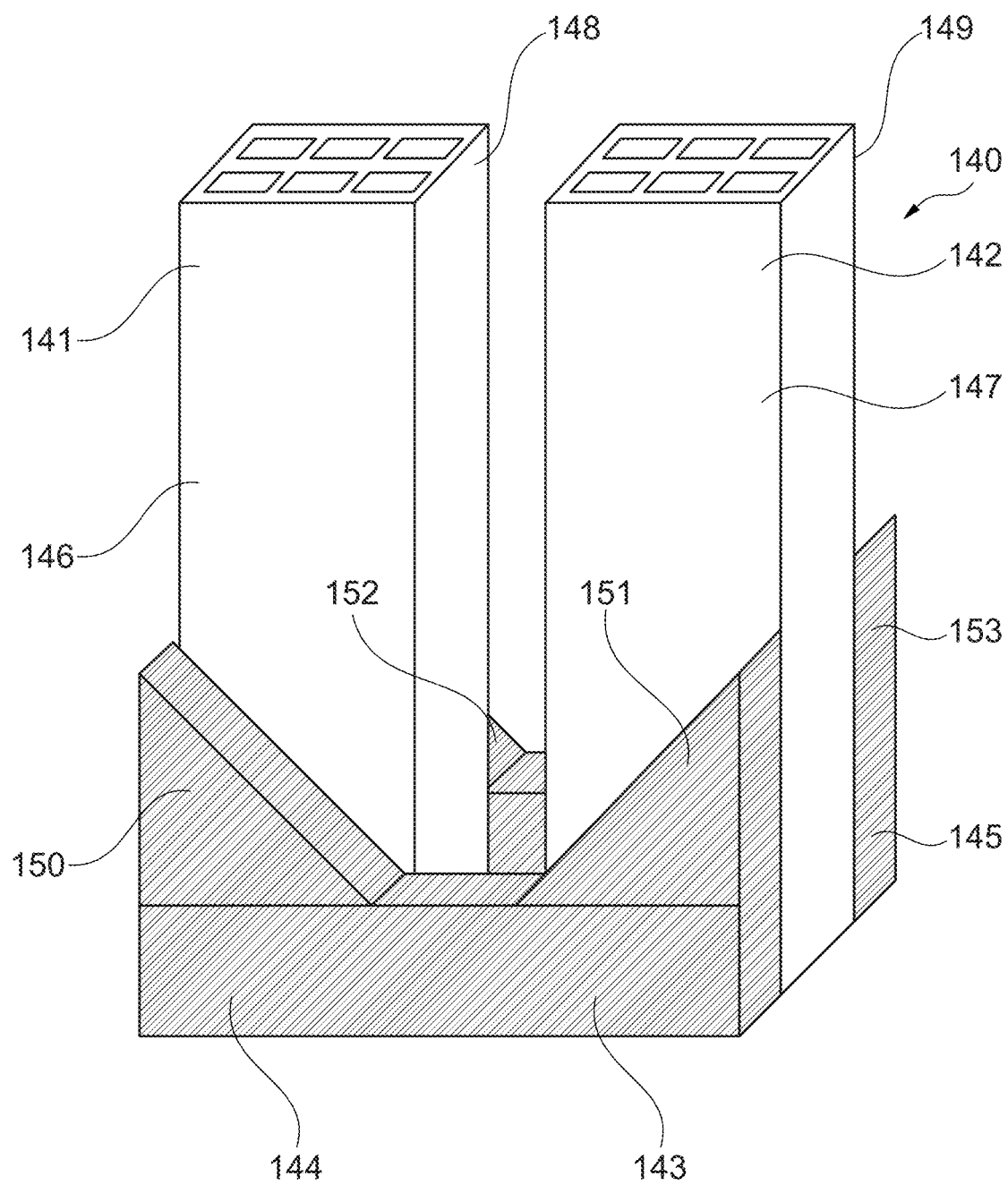
FIG. 10 shows a perspective view of an array of the invention comprising two monoliths and a monolith bridge at the second end of the array in the form of two I-shaped boxes with triangular extensions.

FIG. 10 shows an array 140 comprising a first monolith 141 and a second monolith 142 and a monolith bridge 143 connecting the first and second monoliths 141 and 142. The first and second monoliths 141 and 142 have a quadratic cross section and are arranged so as to have parallel surfaces. The monolith bridge 143 is in the form of two box-shaped linear sections 144 and 145 with a quadratic cross section, wherein section 144 on one side of the monoliths 141 and 142 is connected to the two side surfaces 146 and 147 of the monoliths 141 and 142, and wherein section 145 on the opposing side of the monoliths 141 and 142 is connected to the two side surfaces 148 and 149 of the monoliths 141 and 142.

The linear section 144 comprise extensions 150 and 151 at the end situated closest to the first end of the array 140. The linear section 145 comprise extensions 152 and 153 at the end situated closest to the first end of the array 140. The extensions 150-153 have the form of a box with a triangular cross-section as viewed in a direction perpendicular to the side surface, wherein the triangle slopes from the back surface of the monoliths 141 and 142 to their front surface.

The electrical current running from the first monolith 141 to the second monolith 142 will run partly through the linear sections 144 and 145 and partly through the triangular extensions. Thus, the bridge 143 provides an increased cross section area for the current to run through and hence a reduced resistivity and a reduced heating of the bridge, which in turn reduces the risk of hot spots from occurring. Moreover, due to fact that the cross-sectional area of the extensions 150-153 increases towards the back surface of the monoliths, the flow of current is distributed over the full extension of the side surfaces of the monoliths. Thus, by such a design the risk of hot spots occurring is even further reduced.

Figure 11:
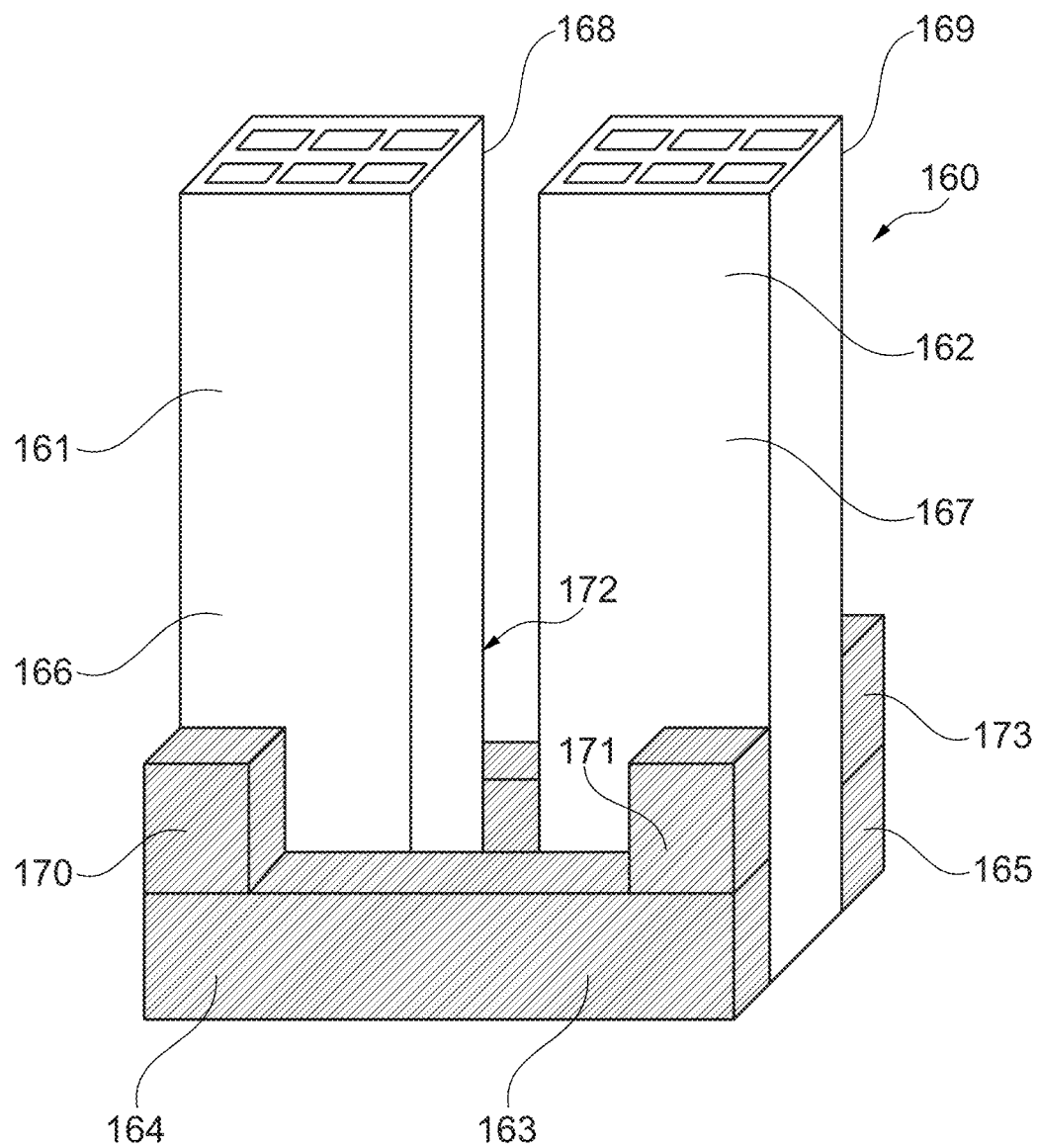
FIG. 11 shows a perspective view of an array of the invention comprising two monoliths and a monolith bridge at the second end of the array in the form of two I-shaped boxes with cubic extensions.

FIG. 11 shows an array 160 comprising a first monolith 161 and a second monolith 162 and a monolith bridge 163 connecting the first and second monoliths 161 and 162. The first and second monoliths 161 and 162 have a quadratic cross section and are arranged so as to have parallel surfaces. The monolith bridge 163 is in the form of two box-shaped linear sections 164 and 165 with a quadratic cross section, wherein section 164 on one side of the monoliths 161 and 162 is connected to the two side surfaces 166 and 167 of the monoliths 161 and 162, and wherein section 165 on the opposing side of the monoliths 161 and 162 is connected to the two side surfaces 168 and 169 of the monoliths 161 and 162.

The linear section 164 comprise extensions 170 and 171 at their end situated closest to the first end of the array 160. The linear section 165 comprise extensions 172 and 173 at their end situated closest to the first end of the array 160. The extensions 170-173 have the form of a box with a quadratic cross-section as viewed in a direction perpendicular to the side surface.

The design of the bridge 163 reduces the risk of hot spots from occurring for the same reasons as described in connection with FIG. 10.

Figure 12:
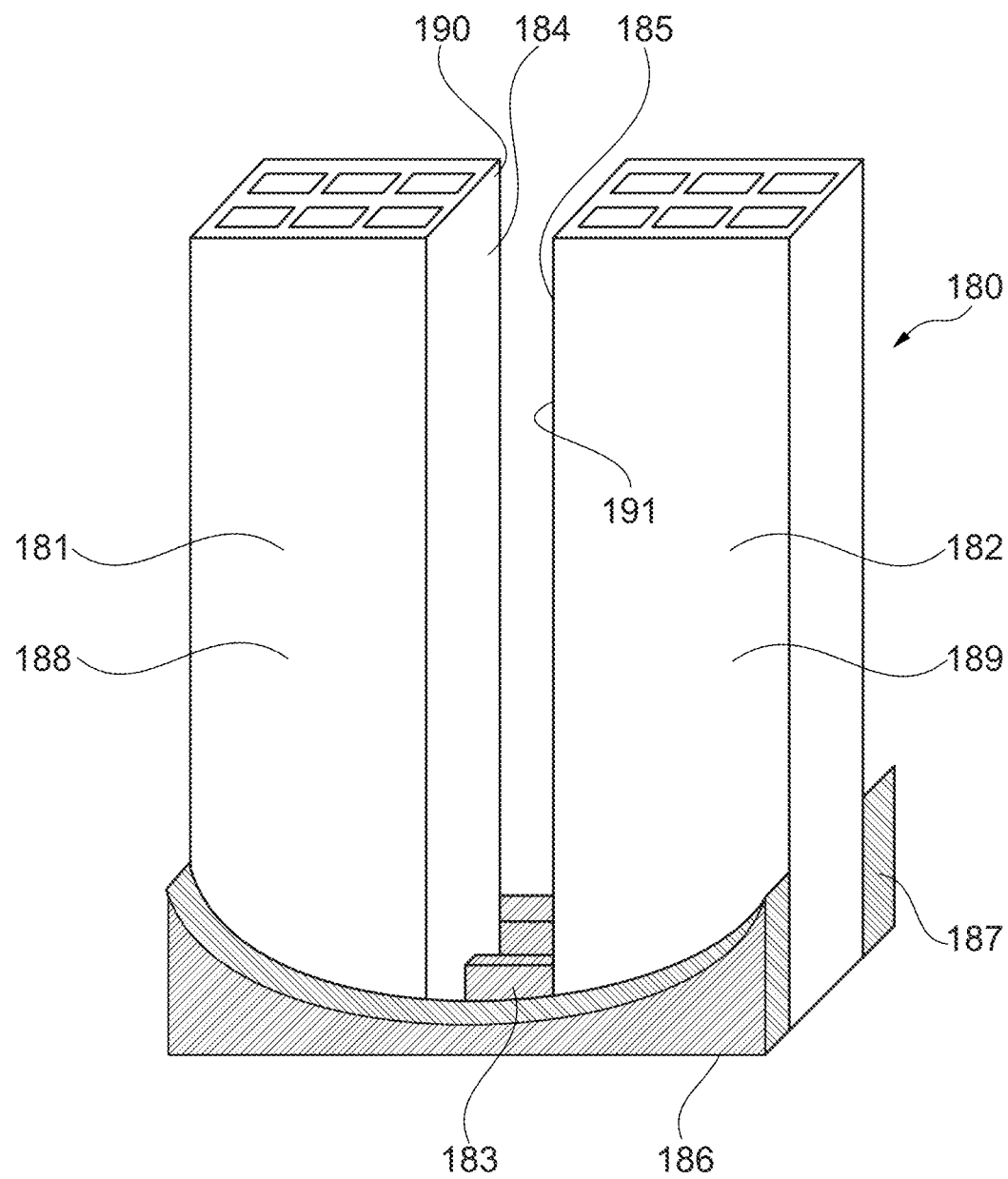
FIG. 12 shows a perspective view of an array of the invention comprising two monoliths and a monolith bridge at the second end of the array in the form of two I-shaped bodies with a lower straight line edge and an upper edge with an outline as a partial ellipse.

FIG. 12 shows an array 180 comprising a first monolith 181 and a second monolith 182 and a monolith bridge connecting the first and second monoliths 181 and 182. The first and second monoliths 181 and 182 have a quadratic cross section and are arranged so as to have parallel surfaces. The monolith bridge comprises a spacer section 183 with a rectangular cross section disposed between the two front surfaces 184 and 185 of the first and second monoliths 181 and 182 and two elongated side sections 186 and 187 with a quadratic cross section, wherein section 186 is connected to the side surfaces 188 and 189 of one side of the monoliths 181 and 182 but not to the side surface of the spacer section 183, and wherein section 187 is connected to the side surfaces 190 and 191 of the opposite side of the monoliths 181 and 182 but not to the side surface of the spacer section 183.

The side sections 186 and 187 each has the form of an elongated body with a longitudinal axis connecting the side surfaces of the two monoliths to be connected and having a form as viewed from a direction perpendicular to the side surfaces with a straight line at the edge of the side section closest to the second end of the monoliths and with a curve in the form of an partial ellipse at the edge of the side section closest to the first end of the monoliths, wherein the curve in the form of an partial ellipse has a declining profile in a direction from the back surfaces towards the front surfaces of the monoliths. Such a design allows for a better current distribution, and thereby reduced risk of hot spot development.

Figure 13:
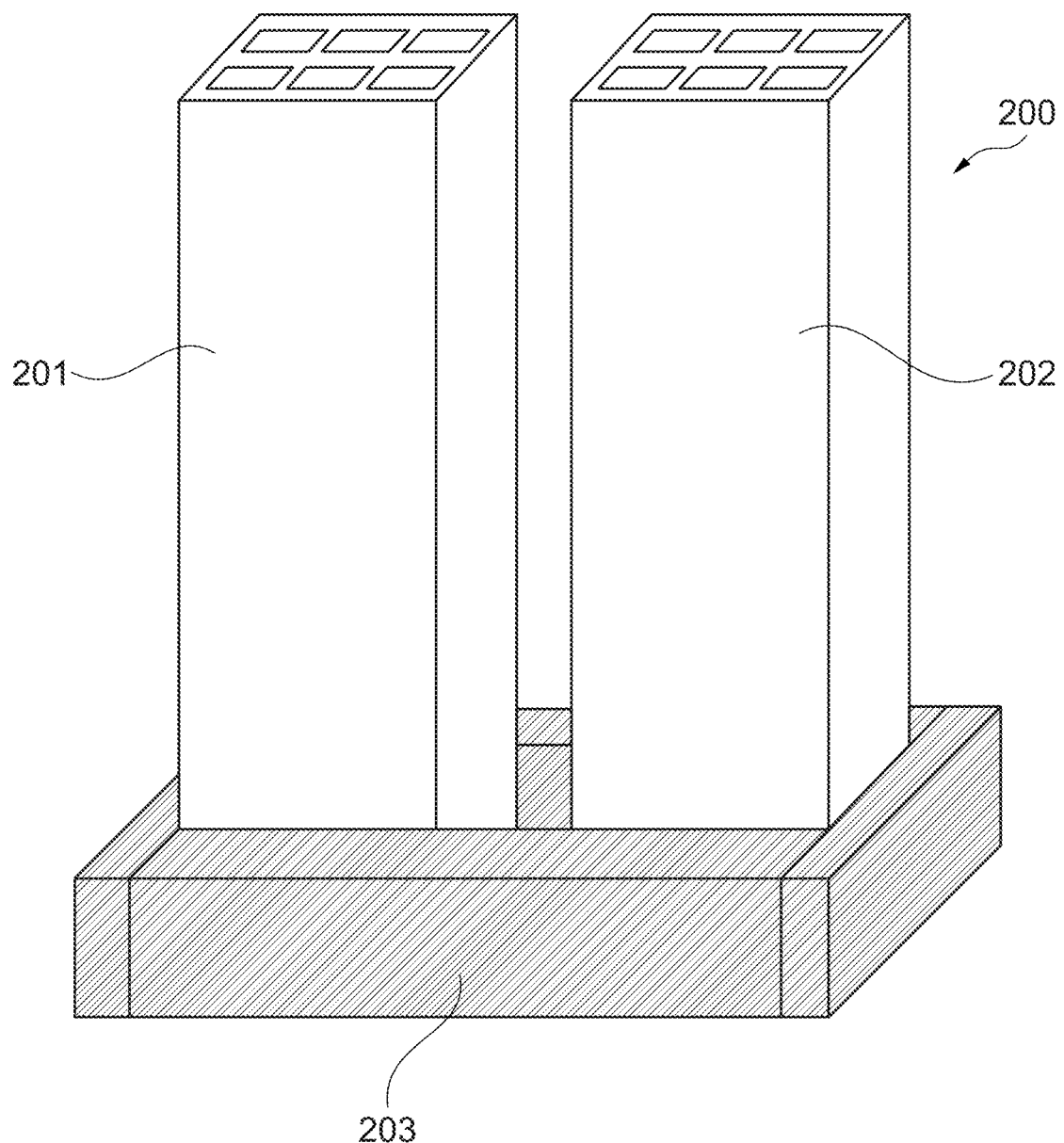
FIG. 13 shows a perspective view of an array of the invention comprising two monoliths and a monolith bridge at the second end of the array in the form of an O-shaped box.

FIG. 13 shows an array 200 comprising a first monolith 201 and a second monolith 202 and a monolith bridge 203 connecting the first and second monoliths 201 and 202. The first and second monoliths 201 and 202 have a quadratic cross section and are arranged so as to have parallel surfaces. The monolith bridge 203 has the form of a box-shaped, rectangular frame with a rectangular cross section, wherein said frame is connected to the side surfaces and the back surface of the monoliths 201 and 202. Such a design allows for a better current distribution, and thereby reduced risk of hot spot development.

Figure 14:
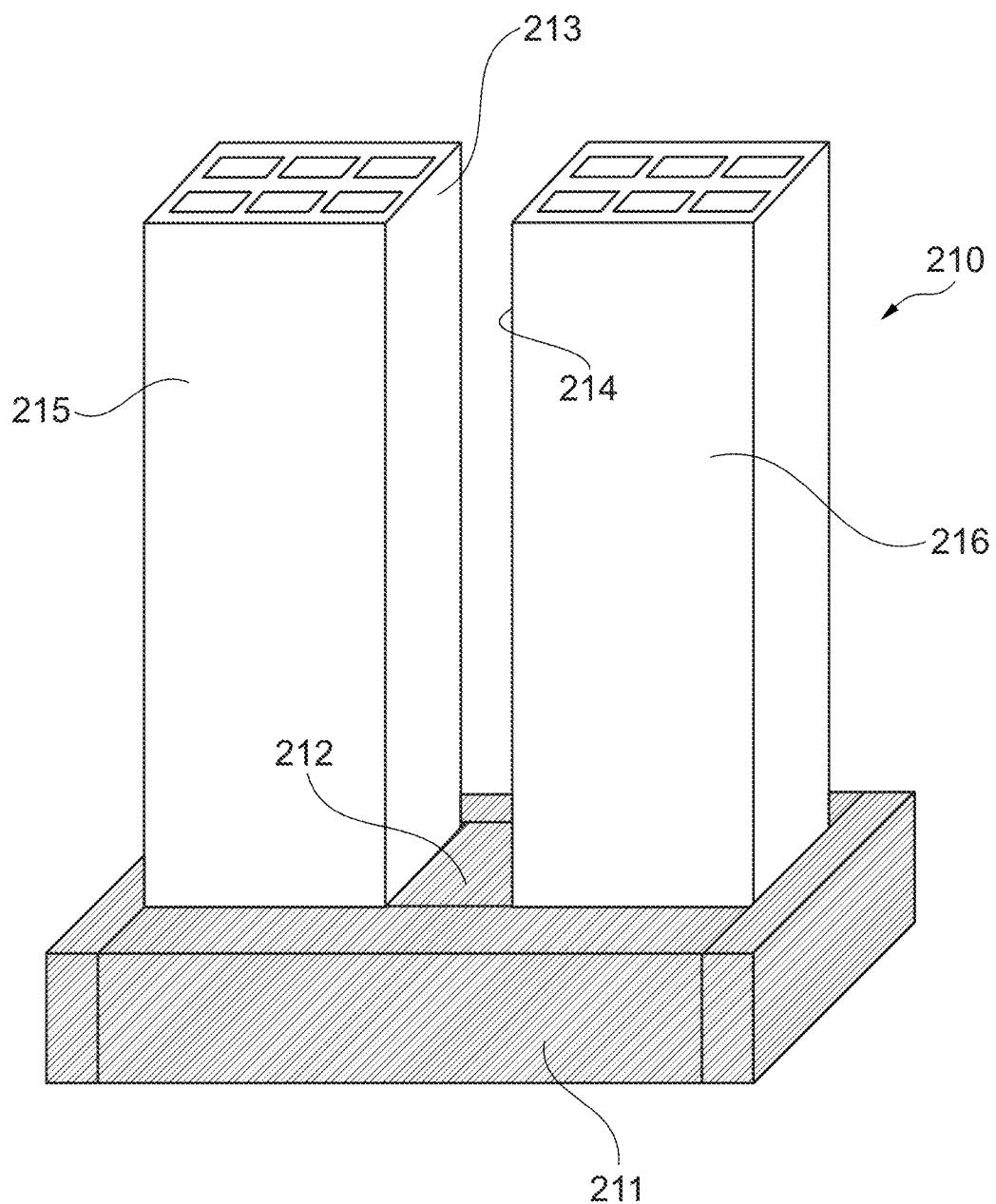
FIG. 14 shows a perspective view of an array of the invention comprising two monoliths and a monolith bridge at the second end of the array in the form of an 8-shaped box.

FIG. 14 shows an array 210 with the same construction as that of the array shown in FIG. 13 except that the monolith bridge in addition to the box-shaped, rectangular frame 211 comprises a spacer section 212 disposed between the two front surfaces 213 and 214 of the first and second monoliths 215 and 216. The side surfaces of the spacer section 212 are connected to the side surfaces of the said frame. Such a design allows for even better current distribution, and thereby reduced risk of hot spot development.

EXAMPLES

Figure 15B:
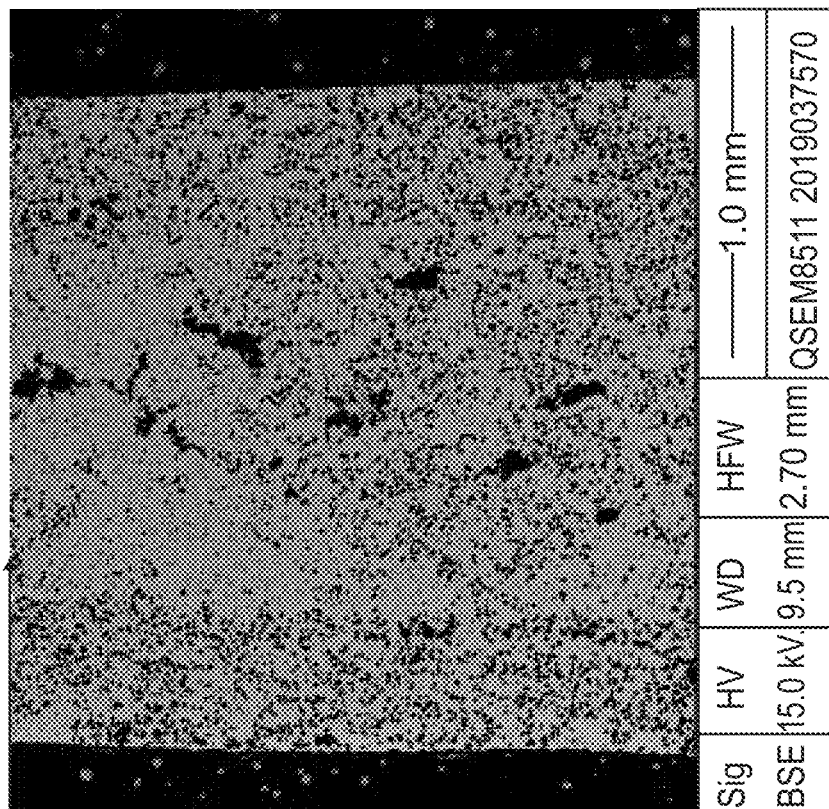
FIG. 15 shows pictures (FIGS. 15A, 15B and 15D) of an array according to the invention and a chart (FIG. 15C) of material composition across the bridge.
Figure 15A:
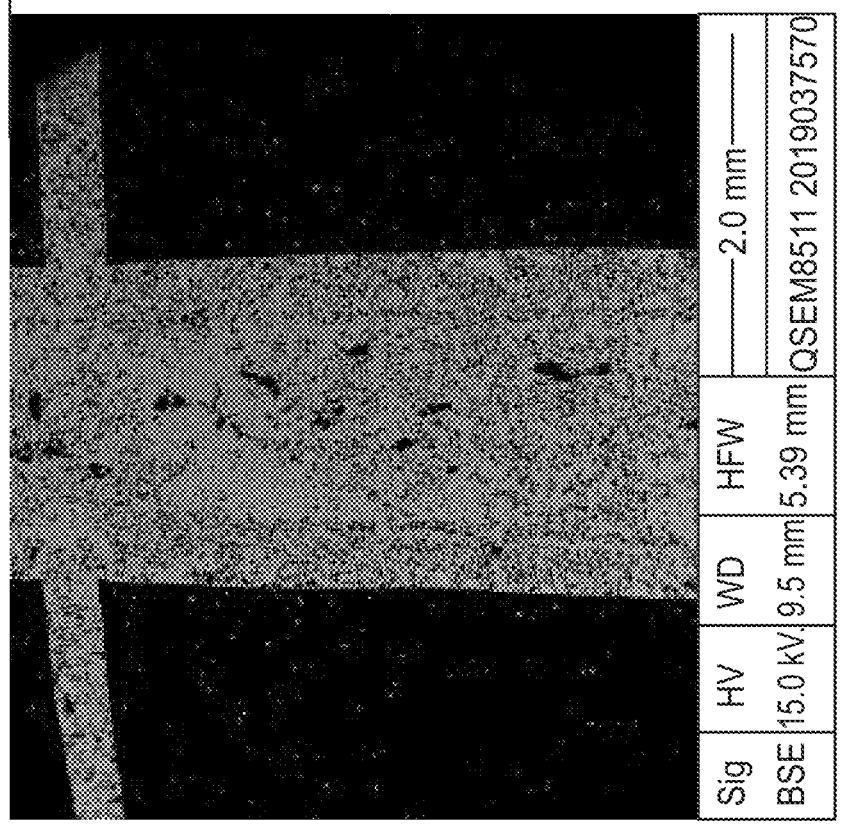

Example 1: Photographic Analysis of Array of the Invention and Testing of Structural Properties FIG. 15 shows an example of an array according to the invention, where two monoliths of 10 channels are connected with a monolith bridge. The monolith has a length of 12 cm and a rectangular cross-sectional plane with dimensions 1.5×3.0 cm. The monolith bridge has a length of 1.3 cm between the monoliths and is connected to the monoliths with a contact area of 1.0×3.0 cm.

Figures 15C, 15D:
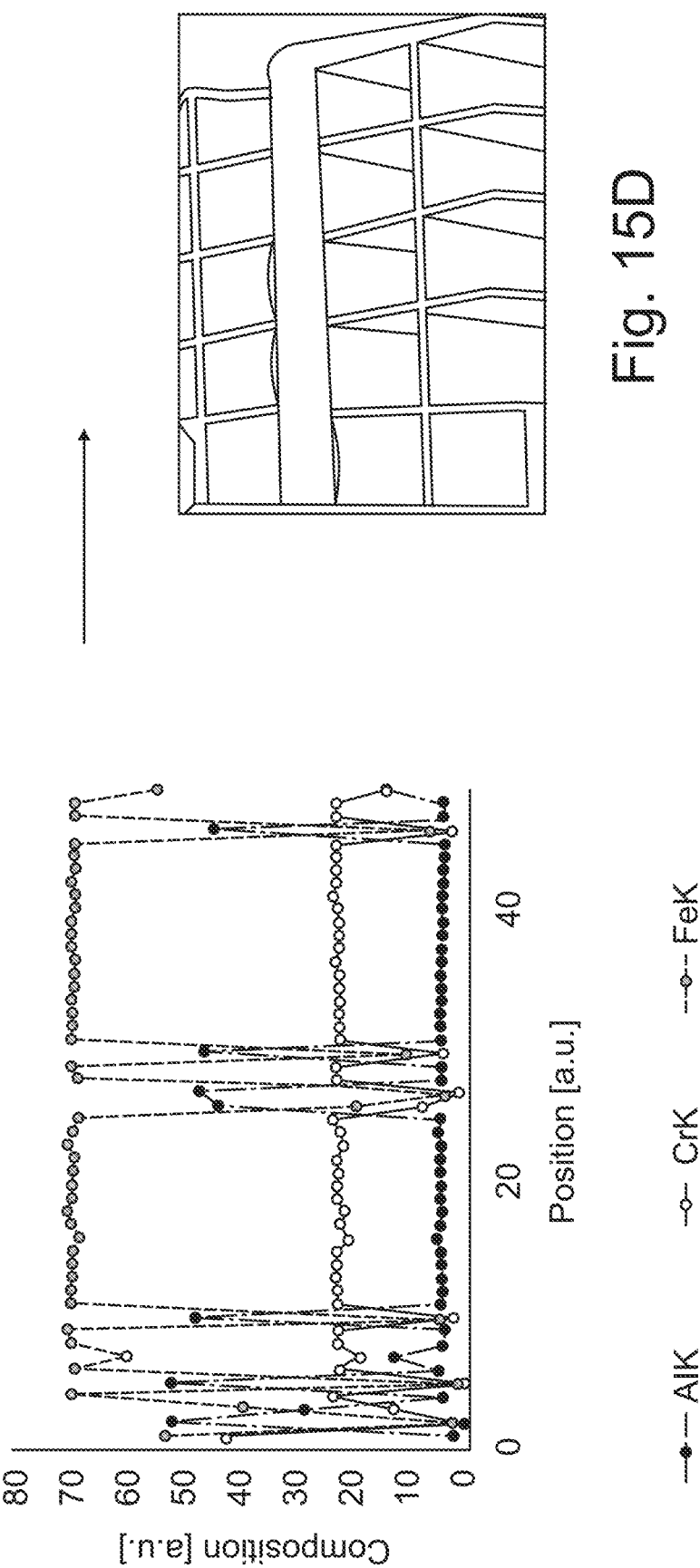

All three entities were prepared from the same metal powder material of FeCrAlloy. Analyzing the bridge with scanning electron microscopy and energy-dispersive X-ray spectroscopy shows:

1. Visually the bridge cannot be distinguished from the monoliths as there is no apparent separation or interface between the connected sections in the SEM pictures, cf. FIGS. 15A, 15B and 15D. The only distinguishing feature between the three entities is a slightly higher porosity in the monoliths as compared to the bridge material, resulting in a higher proportion of voids in the monoliths.
2. The material composition across the monolith-bridge-monolith section is indistinguishable, cf. FIG. 15C, because the same metal powder material was used as illustrated by the line scan analysis. Also, the graph confirms that there is no apparent difference in material composition in the interface between the connected sections as compared to the composition in the monoliths and bridge. The drops in signal of the graph of FIG. 15C is a consequence of scanning through a void in the material.

Figure 16:
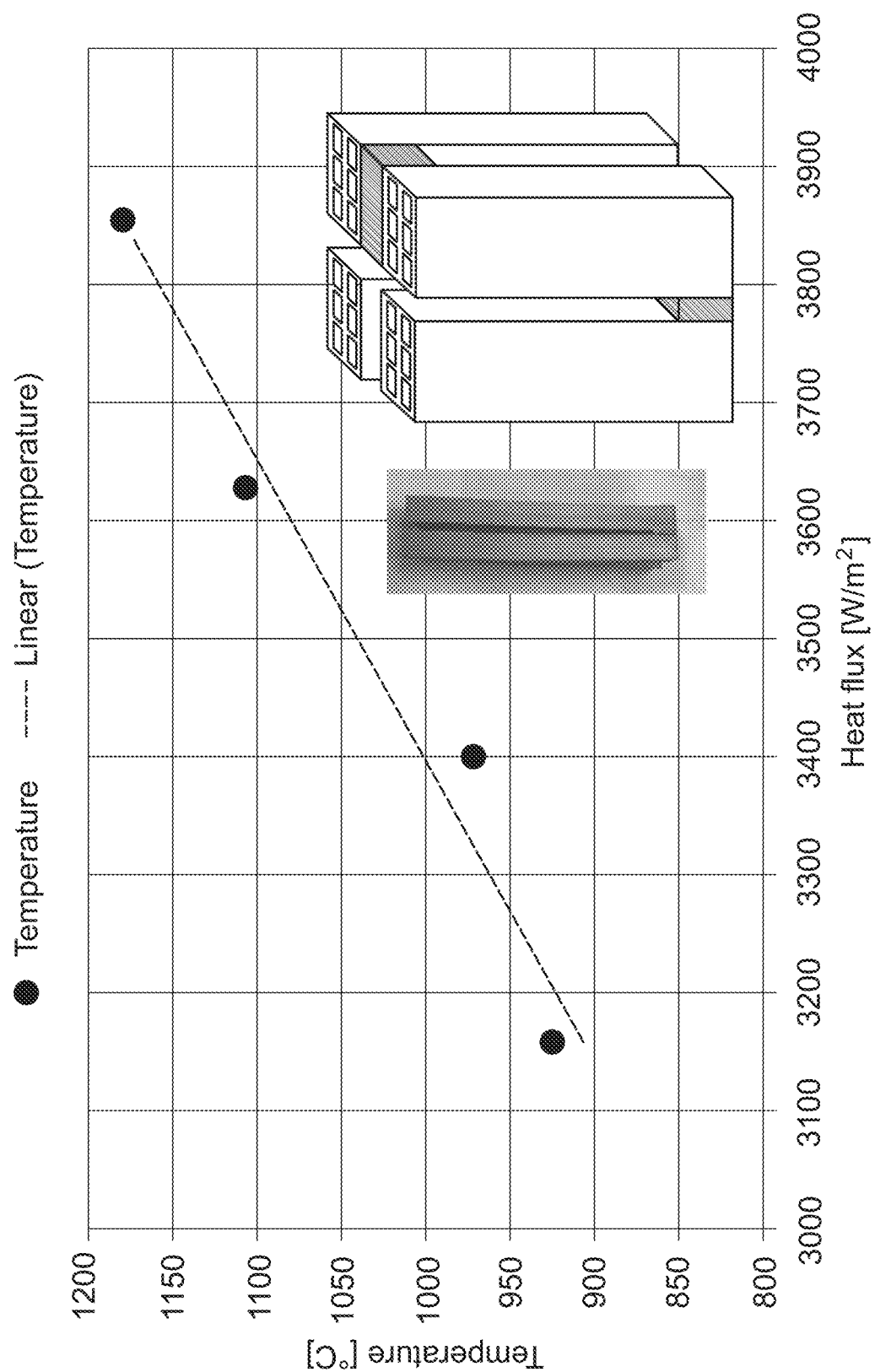
FIG. 16 shows experimental data and operating temperature measured during a steam reforming experiment using an array of the invention.

Example 2: Experimental Data and Operating Temperature Measured During a Steam Reforming Experiment Using an Array of the Invention FIG. 16 shows experimental data and operating temperature measured during a steam reforming reaction experiment in an array according to the invention, where 4 monoliths with an outer dimension of 12 cm (length)×1 cm×1 cm are connected with monolith bridges with a length of 1.3 mm between the monoliths at alternating ends. An AC-power supply is connected to the uppermost 1 cm of the first end of the first monolith and the uppermost 1 cm of the first end of the fourth monolith. In the experiment, a feedstock of 32% $CH_4$, 2% $H_2$, and 66% $H_2O$ with a total feed flow of 100 Nl/h was fed to a reactor system of the invention at a feed temperature of 251° C. and a pressure of 9 barg, where the feed temperature corresponds to the temperature of the first end of the array. The data shows the temperature measured close to the second end of the monoliths as a function of the energy flux into the feed gas. This illustrates how this embodiment of the array of the invention is temperature resistant to at least 1180° C. in the experiment without experiencing any mechanical failure. Additionally, the data illustrates that the invention allows for having an electrically heated array with a pronounced temperature profile over the length of the array, where in the given case the temperature increases approximately 900° C. from the first to the second end. It is an advantage of the invention to have a relatively colder end to handle the electrical connections with electrical conductors to the attached power supply, while still reaching high outlet temperatures to facilitate high temperature endothermic reactions.

Figure 17:
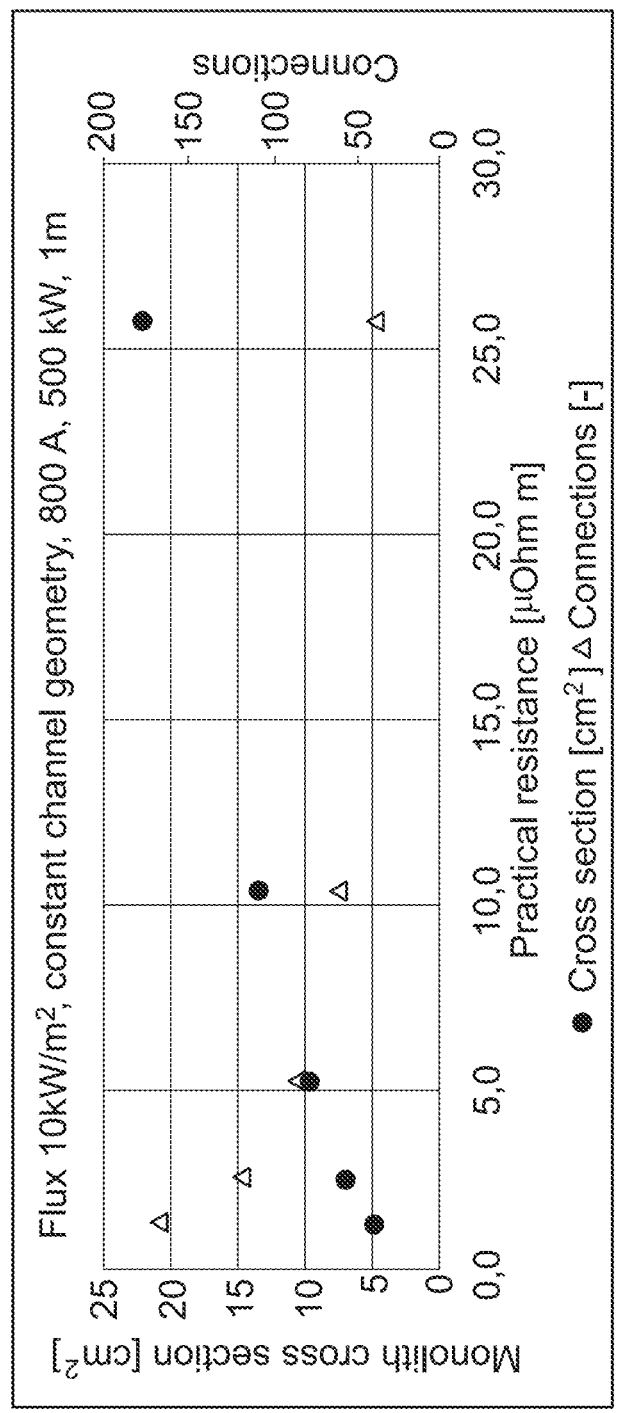
FIG. 17 shows an example of the optimal geometry configuration of monoliths serially connected with monolith bridges in a structured catalyst for providing 500 kW of energy to facilitate an endothermic reaction at a roughly constant surface flux of 10 kW/m$^2$.

Example 3: Optimal Geometry Configuration of Monoliths Serially Connected with Monolith Bridges FIG. 17 shows an example of an optimal geometry configuration of monoliths serially connected with monolith bridges in an array of the invention for providing 500 kW of energy to facilitate an endothermic reaction at a roughly constant surface flux of 10 $kW/m^2$ using an electrical circuit of 800 A and 625 V. The monoliths have square channels of approximately 0.25 cm×0.25 cm, walls with a thickness of 0.44 mm, and a length of 0.5 m. The example illustrates the required cross section of the monolith as a function of the practical resistance. A number of arrays are tested, which have different resistivities achieved by using different material compositions in the form of a composite of a metallic material and a ceramic material.

The experiment illustrates that by applying a higher resistance monolith as achieved by the composite material, an increased cross section of the monolith can be used which provides a possibility of reducing the number of monoliths required. This in turn reduces the required number of monolith bridges and hence the number of connection required to construct an array of the invention. Overall, the graph illustrates how the concept of the present invention with respect to connecting monoliths and with respect to selecting materials with different resistivities collectively enables production of a monolith array with improved properties.

Example 4

Figure 18:
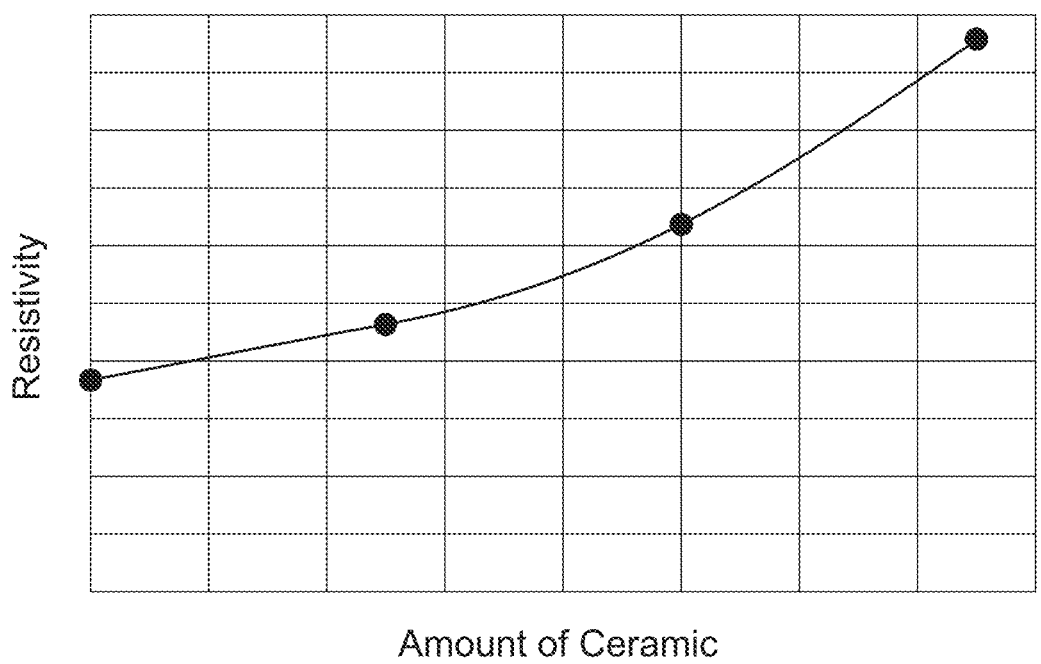
FIG. 18 shows experimental data for how the resistivity p of a material varies as a function of the content of ceramic in the form of AlO.

FIG. 18 shows results obtained during the development of the present invention. It shows how the resistivity p of a material varies as a function of the content of ceramic in the form of AlO. The graph is based on experiments where the resistivity along a composite component as used in the catalyst of the invention as described above was measured. The resistivity was measured by applying a known current to the component and measuring the voltage drop with two probes arranged in contact with the component with a fixed distance between them. The experiments were made both at room temperature and at a higher temperature, and both showed varying resistivity.

The experiments show that it is possible to produce a composite material of an electrically conductive metallic material and a ceramic material with a selected resistivity within wide ranges.

The invention claimed is:

1. A structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material is a composite in the form of a homogenous mixture of an electrically conductive metallic material and a ceramic material.

2. Catalyst according to claim 1, wherein the metallic material is an alloy comprising one or more substances selected from the group consisting of Fe, Cr, Al, Co, Ni, Zr, Cu, Ti, Mn, and Si.

3. Catalyst according to claim 1, wherein the ceramic material is an oxide of a substance selected from the group consisting of Al, Mg, Ce, Zr, Ca, Y and La.

4. Catalyst according to claim 1, wherein the ratio based on weight of metallic material to ceramic material in the macroscopic structure is in the range of from 50 to 1.

5. Catalyst according to claim 1, wherein the structured catalyst has the form of at least one monolith, wherein the monolith has a number of flow channels formed therein for conveying said feed gas through the monoliths from a first end, where the feed gas enters, to a second end, where a product gas exits, wherein said monolith has a longitudinal axis extending form said first end to said second end.

6. Catalyst according to claim 5, wherein the macroscopic structure of the monolith is composed of two or more composite materials with different compositions positioned in the direction of said longitudinal axis so as provide different resistivities.

7. Catalyst according to claim 6, wherein the macroscopic structure of the monolith is composed of at least three composite materials.

8. Catalyst according to claim 7, wherein the macroscopic structure of the monolith comprises at least a first, a second and a third composite material positioned in the direction from the first to the second end, wherein the second composite material has a higher resistivity as compared to the first and third composite material, the third composite material has a lower resistivity as compared to the first and second composite material, and the first composite material has a resistivity in between the second and third composite material.

9. Array comprising a first and a second structured catalyst according to claim 1, wherein:
   a) the first and second structured catalyst have the form of a first and second monolith respectively,
   b) each of said first and second monoliths has a number of flow channels formed therein for conveying said feed gas through the monoliths from a first end, where the feed gas enters, to a second end, where a product gas exits, wherein each of said first and second monoliths has a longitudinal axis extending from said first end to said second end;
   c) the array comprises at least a first and a second conductor electrically connected to said first and second monoliths, respectively, and configured to be connected to an electrical power supply, wherein said electrical power supply is dimensioned to heat at least part of said first and second monoliths to a temperature of at least 500° C. by passing an electrical current through said macroscopic structure, wherein said first conductor is electrically connected directly or indirectly to the first monolith and the second conductor is electrically connected directly or indirectly to the second monolith, and wherein the conductors are connected at positions on the array closer to said first end than to said second end,
   d) said first and second monolith are electrically connected by a monolith bridge of a monolith bridge electrically conductive material,
   e) the array is configured to direct an electrical current to run from the first conductor through the first monolith to said second end, then through the bridge, and then through the second monolith to the second conductor, and
   f) said array has been produced by a process comprising the steps of
      i) providing the electrically conductive materials of the first monolith, the second monolith and the monolith bridge in the form of three separate entities, and
      ii) joining the separate entities together by a method comprising a step of sintering or oxidizing treatment.

10. Array according to claim 9, wherein the second conductor is indirectly electrically connected to the second monolith.

11. Array according to claim 10, wherein the array further comprises (i) one or more juxtaposed additional intermediate monoliths of a structured catalyst and (ii) one end monolith of a structured catalyst, wherein each additional intermediate monolith is connected to at least two juxtaposed monoliths by a monolith bridge of a monolith bridge electrically conductive material, and wherein the end monolith is connected to at least one juxtaposed monolith, and wherein the second conductor is connected to the end monolith at a position on the monolith closer to said first end than to said second end.

12. Array according to claim 9, wherein the said first and second monolith are connected by the monolith bridge at the second end of the array.

13. Array according to claim 9, wherein said array has been produced by a process of comprising the steps of
    A) providing the electrically conductive materials of the first monolith, the second monolith and the monolith bridge in the form of three separate entities, wherein the surface areas to be connected are in a moldable state,
    B) contacting the surface areas to be connected in the contact areas,
    C) joining the contact areas together by a method comprising a step of sintering or oxidizing treatment.

14. Array according to claim 9, wherein said array has been produced by a process of comprising the steps of:
    providing a first monolith component comprising metal powder with a first alloy composition and a first soluble binder, the first component having a first joining surface,
    providing a second monolith component comprising metal powder with a second alloy composition and a second soluble binder, the second component having a second joining surface;
    providing a bridge component comprising metal powder with a third alloy composition and a third soluble binder, the bridge component having two third joining surfaces, one at each end of the bridge component;
    wherein the first alloy composition and the second and third alloy compositions all consist of a plurality of chemical elements, and wherein the chemical elements are chosen so that, for each of the chemical elements being present in an amount higher than 0.5 weight % of the respective alloy composition, that chemical element is comprised both in the first and second and third alloy composition, and
      for the chemical elements being present in the first alloy composition in amounts of up to 5.0 weight %, the amount of that chemical element differs by at most 1 percentage point between the first alloy composition on the one hand and each of the second and third alloy compositions on the other hand, and
      for the chemical elements being present in the first alloy composition in amounts of more than 5.0 weight %, the amount of that chemical element differs by at most 3 percentage point between the first alloy composition on the one hand and each of the second and third alloy compositions on the other hand,
    arranging the bridge component between the first monolith component and the second monolith component so that one third joining surface contacts the first joining surface and that the other third joining surface contacts the second joining surface,
    maintaining the joining surfaces in contact for a time period allowing for at least some evaporation of a solvent; and
    subsequently sintering or oxidizing the first, second and third components together while maintaining the joining surfaces in contact or as close together as possible in order to achieve the array.

15. Array according to claim 14, wherein the following step precedes the step of arranging:
- at least partly dissolving the first joining surface and/or the second joining surface by applying the solvent.

16. A reactor system for carrying out an endothermic reaction of a feed gas, said reactor system comprising:
- a) a catalyst of claim 1;
- b) a pressure shell housing said catalyst, said pressure shell comprising an inlet for letting in said feed gas and an outlet for letting out product gas, wherein said inlet is positioned so that said feed gas enters said catalyst in a first end and said product gas exits said catalyst from a second end; and
- c) a heat insulation layer between said structured catalyst and said pressure shell.

17. A structured catalyst arranged for catalyzing an endothermic reaction of a feed gas, said structured catalyst comprising a macroscopic structure of electrically conductive material, said macroscopic structure supporting a ceramic coating, wherein said ceramic coating supports a catalytically active material, wherein the electrically conductive material at least partly is a composite in the form of a homogenous mixture of an electrically conductive metallic material and a ceramic material, wherein the macroscopic structure at least partly is composed of two or more materials with different resistivities.

18. Catalyst according to claim 17, wherein the macroscopic structure at least partly is composed of one or more composite materials and one or more non-composite electrically conductive metallic materials.

19. Catalyst according to claim 17, wherein the metallic material is an alloy comprising one or more substances selected from the group consisting of Fe, Cr, Al, Co, Ni, Zr, Cu, Ti, Mn, and Si.

20. Catalyst according to claim 17, wherein the ceramic material is an oxide of a substance selected from the group consisting of Al, Mg, Ce, Zr, Ca, Y and La.

21. Catalyst according to claim 17, wherein the ratio based on weight of metallic material to ceramic material in the macroscopic structure is in the range of from 50 to 1.

22. Catalyst according to claim 17, wherein the structured catalyst has the form of at least one monolith, wherein the monolith has a number of flow channels formed therein for conveying said feed gas through the monoliths from a first end, where the feed gas enters, to a second end, where a product gas exits, wherein said monolith has a longitudinal axis extending form said first end to said second end.

23. Catalyst according to claim 22, wherein the macroscopic structure of the monolith is composed of two or more composite materials with different compositions positioned in the direction of said longitudinal axis so as provide different resistivities.

24. Catalyst according to claim 23, wherein the macroscopic structure of the monolith is composed of at least three composite materials.

25. Catalyst according to claim 24, wherein the macroscopic structure of the monolith comprises at least a first, a second and a third composite material positioned in the direction from the first to the second end, wherein the second composite material has a higher resistivity as compared to the first and third composite material, the third composite material has a lower resistivity as compared to the first and second composite material, and the first composite material has a resistivity in between the resistivity of the second and third composite material.

26. Catalyst according to claim 22, wherein the macroscopic structure of the monolith is composed of one or more composite materials with different compositions and one non-composite electrically conductive metallic material positioned in the direction of said longitudinal axis so as provide different resistivities.

27. Catalyst according to claim 26, wherein the macroscopic structure of the monolith comprises at least a first and a second composite material and a non-composite electrically conductive metallic material positioned in the direction from the first to the second end, wherein the second composite material has a higher resistivity as compared to the first composite material and the non-composite material, the non-composite material has a lower resistivity as compared to the first and second composite material, and the first composite material has a resistivity in between the resistivity of the second composite material and the resistivity of the non-composite material.

28. Array comprising a first and a second structured catalyst according to claim 17, wherein:
- a) the first and second structured catalyst have the form of a first and a second monolith, respectively;
- b) each of said first and second monoliths has a number of flow channels formed therein for conveying said feed gas through the monoliths from a first end, where the feed gas enters, to a second end, where a product gas exits, wherein each of said first and second monoliths has a longitudinal axis extending from said first end to said second end;
- c) the array comprises at least a first and a second conductor electrically connected to said first and second monoliths, respectively, and configured to be connected to an electrical power supply, wherein said electrical power supply is dimensioned to heat at least part of said first and second monoliths to a temperature of at least 500° C. by passing an electrical current through said macroscopic structure, wherein said first conductor is electrically connected directly or indirectly to the first monolith and the second conductor is electrically connected directly or indirectly to the second monolith, and wherein the conductors are connected at positions on the array closer to said first end than to said second end,
- d) said first and second monolith are electrically connected by a monolith bridge of a monolith bridge electrically conductive material,
- e) the array is configured to direct an electrical current to run from the first conductor through the first monolith to said second end, then through the bridge, and then through the second monolith to the second conductor, and
- f) said array has been produced by a process comprising the steps of
  - i) providing the electrically conductive materials of the first monolith, the second monolith and the monolith bridge in the form of three separate entities, and
  - ii) joining the separate entities together by a method comprising a step of sintering or oxidizing treatment.

29. Array according to claim 28, wherein the second conductor is indirectly electrically connected to the second monolith.

30. Array according to claim 29, wherein the array further comprises (i) one or more juxtaposed additional intermediate monoliths of a structured catalyst and (ii) one end monolith of a structured catalyst, wherein each additional intermediate monolith is connected to at least two juxtaposed monoliths by a monolith bridge of a monolith bridge electrically conductive material, and wherein the end monolith is connected to at least one juxtaposed monolith, and wherein the second conductor is connected to the end monolith at a position on the monolith closer to said first end than to said second end.

31. Array according to claim 28, wherein the said first and second monolith are connected by the monolith bridge at the second end of the array.

32. Array according to claim 28, wherein said array has been produced by a process of comprising the steps of
   A) providing the electrically conductive materials of the first monolith, the second monolith or the intermediate monoliths and the monolith bridge in the form of three separate entities, wherein the surface areas to be connected are in a moldable state,
   B) contacting the surface areas to be connected in the contact areas,
   C) joining the contact areas together by a method comprising a step of sintering or oxidizing treatment.

33. Array according to claim 28, wherein said array has been produced by a process of comprising the steps of:
   providing a first monolith component comprising metal powder with a first alloy composition and a first soluble binder, the first component having a first joining surface,
   providing a second monolith component comprising metal powder with a second alloy composition and a second soluble binder, the second component having a second joining surface;
   providing a bridge component comprising metal powder with a third alloy composition and a third soluble binder, the bridge component having two third joining surfaces, one at each end of the bridge component;
   wherein the first alloy composition and the second and third alloy compositions all consist of a plurality of chemical elements, and wherein the chemical elements are chosen so that, for each of the chemical elements being present in an amount higher than 0.5 weight % of the respective alloy composition, that chemical element is comprised both in the first and second and third alloy composition, and
      for the chemical elements being present in the first alloy composition in amounts of up to 5.0 weight %, the amount of that chemical element differs by at most 1 percentage point between the first alloy composition on the one hand and each of the second and third alloy compositions on the other hand, and
      for the chemical elements being present in the first alloy composition in amounts of more than 5.0 weight %, the amount of that chemical element differs by at most 3 percentage point between the first alloy composition on the one hand and each of the second and third alloy compositions on the other hand,
   arranging the bridge component between the first monolith component and the second monolith component so that one third joining surface contacts the first joining surface and that the other third joining surface contacts the second joining surface,
   maintaining the joining surfaces in contact for a time period allowing for at least some evaporation of a solvent; and
   subsequently sintering or oxidizing the first, second and third components together while maintaining the joining surfaces in contact or as close together as possible in order to achieve the array.

34. Array according to claim 33, wherein the following step precedes the step of arranging:
   at least partly dissolving the first joining surface and/or the second joining surface by applying the solvent.

35. A reactor system for carrying out an endothermic reaction of a feed gas, said reactor system comprising:
   a) a catalyst of claim 17;
   b) a pressure shell housing said catalyst, said pressure shell comprising an inlet for letting in said feed gas and an outlet for letting out product gas, wherein said inlet is positioned so that said feed gas enters said catalyst in a first end and said product gas exits said catalyst from a second end; and
   c) a heat insulation layer between said structured catalyst and said pressure shell.

\* \* \* \* \*